(12) United States Patent
Bhrara et al.

(10) Patent No.: US 7,587,453 B2
(45) Date of Patent: Sep. 8, 2009

(54) METHOD AND SYSTEM FOR DETERMINING APPLICATION AVAILABILITY

(75) Inventors: Raminder Singh Bhrara, Pearce (AU); Philip Andrew Watkins, Queanbeyan (AU)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 11/326,559

(22) Filed: Jan. 5, 2006

(65) Prior Publication Data

US 2007/0156889 A1    Jul. 5, 2007

(51) Int. Cl.
*G06F 15/16*    (2006.01)
*G06F 11/00*    (2006.01)

(52) U.S. Cl. .................. 709/204; 709/217; 709/218; 709/219; 709/223; 709/224; 709/225; 709/226; 715/210; 717/174; 717/175; 717/176; 717/177; 717/178

(58) Field of Classification Search ......... 709/223–226, 709/217–219; 715/210; 717/174–178
See application file for complete search history.

(56) References Cited

U.S. PATENT DOCUMENTS

| | | | |
|---|---|---|---|
| 6,070,190 A | | 5/2000 | Reps et al. |
| 6,571,285 B1 | * | 5/2003 | Groath et al. ............... 709/223 |
| 6,779,039 B1 | | 8/2004 | Bommareddy et al. |
| 7,020,697 B1 | * | 3/2006 | Goodman et al. ........... 709/223 |
| 7,206,805 B1 | * | 4/2007 | McLaughlin, Jr. .......... 709/203 |
| 2002/0138559 A1 | * | 9/2002 | Ulrich et al. ................ 709/203 |
| 2004/0177244 A1 | * | 9/2004 | Murphy et al. .............. 713/100 |
| 2005/0159927 A1 | * | 7/2005 | Cruz et al. .................. 702/188 |

FOREIGN PATENT DOCUMENTS

JP    11345219 A  * 12/1999

OTHER PUBLICATIONS

Web Coordination Bonds: A Simple Enhancement to Web Services Infrastructure for Effective Collaboration by Prasad et al., Proceedings of the 37th Hawaii International Conference on System Sciences, IEEE, 2004.*

(Continued)

*Primary Examiner*—Ashok Patel
*Assistant Examiner*—Linglan Edwards
(74) *Attorney, Agent, or Firm*—Schmeiser, Olsen & Watts; William H. Steinberg

(57) ABSTRACT

A method and system for determining an availability of an application. Pairs of processes utilized by the application are determined. Each pair includes consumer and provider processes. For each pair, a diagnostic transaction is initiated by the pair's consumer process, utilizes an application programming interface (API) to open a connection between the consumer process and provider process and to request access to a resource managed by the provider process. Any communication between a pair's consumer and provider processes uses the same API. The diagnostic transaction is completed by receiving or not receiving, at the consumer process, a response from the pair's provider process where the response provides the requested access. Receipt of the response designates the provider process as available to the application, whereas non-receipt of the response designates the provider process as unavailable. If responses are received for all diagnostic transactions, the application is available.

20 Claims, 15 Drawing Sheets

OTHER PUBLICATIONS

Wagner, et al.; An End-User Tool for E-Commerce Debugging; IUI'03, Jan. 12-15, 2003, Miami, Florida, USA; ACM 1-58113-586-6/03/001; p. 331; E-mail : {ewagner, lieber}@media.mit.edu.

Leguizamo et al.; Fault Tolerance Technology for Autonomous Decentralized Database Systems; pp. 329-338; E-mail: {cperez, oh}@mori.cs.titech.ac.jp, mori@cs.titech.ac.jp.

Subramanian, et al.; Real-Time Aware Protocols for General E-Commerce and Electronic Auction Transactions; Department of Computer and Information Sciences; The Ohio State University, Columbus, OH 43210; 6 pages/.

Frolund et al.; Ruminations on Domain=Based Reliable Broadcast; Hewlett-Packard Laboratories, Palo Alto, CA 94394, USA; 18 pages.

O'Neill, et al.; Measuring the quality of the on-line service experience: inferred versus direct disconfirmation modelling; 17 pages.

Rish, et al.; Real-time problem determination in distributed systems using active probing; Network Operations and Management Symposium 2004. NOMS 2004. IEEE/IFIP Publication Date: Apr. 19-23, 2004; vol. 1; pp. 133-146; ISBN: 0-7803-8230-7.

* cited by examiner

*390*

CONSUMER SOFTWARE PROCESS $$\begin{array}{c} \text{PROVIDER SOFTWARE PROCESS} \end{array} \begin{array}{c} \phantom{P_1} \\ P_1 \\ P_2 \\ P_3 \\ P_4 \\ P_5 \end{array} \begin{pmatrix} P_1 & P_2 & P_3 & P_4 & P_5 \\ 0 & 0 & 0 & 0 & 0 \\ I_1 & 0 & 0 & 0 & 0 \\ 0 & I_2 & 0 & 0 & 0 \\ 0 & I_3 & 0 & 0 & 0 \\ 0 & I_4 & 0 & I_5 & 0 \end{pmatrix}$$

CONSUMER SOFTWARE PROCESS $$\begin{array}{c} \text{PROVIDER SOFTWARE PROCESS} \end{array} \begin{array}{c} \phantom{P_1} \\ P_1 \\ P_2 \\ P_5 \\ P_6 \\ P_7 \end{array} \begin{pmatrix} \begin{array}{ccccc} P_1 & P_2 & P_5 & P_6 & P_7 \\ 0 & 0 & 0 & 0 & 0 \\ I_1 & 0 & 0 & 0 & 0 \\ 0 & I_6 & 0 & 0 & 0 \\ 0 & I_7 & 0 & 0 & 0 \\ 0 & 0 & 0 & I_8 & 0 \end{array} \end{pmatrix}$$

CONSUMER SOFTWARE PROCESS

|  | $P_1$ | $P_2$ | $P_3$ | $P_4$ | $P_5$ | $P_6$ | $P_7$ |
|---|---|---|---|---|---|---|---|
| $P_1$ | 0 | 0 | 0 | 0 | 0 | 0 | 0 |
| $P_2$ | $I_1$ | 0 | 0 | 0 | 0 | 0 | 0 |
| $P_3$ | 0 | $I_2$ | 0 | 0 | 0 | 0 | 0 |
| $P_4$ | 0 | $I_3$ | 0 | 0 | 0 | 0 | 0 |
| $P_5$ | 0 | $I_4$ & $I_6$ | 0 | $I_5$ | 0 | 0 | 0 |
| $P_6$ | 0 | $I_7$ | 0 | 0 | 0 | 0 | 0 |
| $P_7$ | 0 | 0 | 0 | 0 | 0 | $I_8$ | 0 |

PROVIDER SOFTWARE PROCESS

CONSUMER SOFTWARE PROCESS

|   | $P_1$ | $P_2$ | $P_3$ | $P_4$ | $P_5$ |
|---|---|---|---|---|---|
| $P_1$ | 0 | 0 | 0 | 0 | 0 |
| $P_2$ | $I_1$ | 0 | 0 | 0 | 0 |
| $P_3$ | 0 | $I_2$ | 0 | 0 | 0 |
| $P_4$ | 0 | 0 | 0 | 0 | 0 |
| $P_5$ | 0 | $I_4$ | 0 | $I_5$ | 0 |

PROVIDER SOFTWARE PROCESS

CONSUMER SOFTWARE PROCESS

|  | | $P_1$ | $P_2$ | $P_3$ | $P_4$ | $P_5$ | $P_6$ | $P_7$ | $P_8$ | $P_9$ | $P_{10}$ |
|---|---|---|---|---|---|---|---|---|---|---|---|
| | $P_1$ | 0 | 0 | 0 | 0 | 0 | 0 | 0 | 0 | 0 | 0 |
| | $P_2$ | $I_1$ | 0 | 0 | 0 | 0 | $I_1$ | 0 | 0 | 0 | 0 |
| | $P_3$ | 0 | $I_2$ | 0 | 0 | 0 | 0 | 0 | 0 | 0 | 0 |
| | $P_4$ | 0 | $I_3$ | 0 | 0 | 0 | 0 | $I_3$ | 0 | 0 | 0 |
| PROVIDER SOFTWARE PROCESS | $P_5$ | 0 | $I_4$ | 0 | $I_5$ | 0 | 0 | $I_4$ | 0 | $I_5$ | 0 |
| | $P_6$ | 0 | 0 | 0 | 0 | 0 | 0 | 0 | 0 | 0 | 0 |
| | $P_7$ | $I_1$ | 0 | 0 | 0 | 0 | $I_1$ | 0 | 0 | 0 | 0 |
| | $P_8$ | 0 | 0 | 0 | 0 | 0 | 0 | $I_2$ | 0 | 0 | 0 |
| | $P_9$ | 0 | $I_3$ | 0 | 0 | 0 | 0 | $I_3$ | 0 | 0 | 0 |
| | $P_{10}$ | 0 | $I_4$ | 0 | $I_5$ | 0 | 0 | $I_4$ | 0 | $I_5$ | 0 |

*FIG. 6B*

METHOD AND SYSTEM FOR DETERMINING APPLICATION AVAILABILITY

BACKGROUND OF THE INVENTION

1. Technical Field

The present invention relates to a method and system for determining the availability of applications, and in particular to a technique for determining the availability of applications in a multi-tier environment having redundant clusters of servers within each tier, and for isolating faults to the software processes impacting availability.

2. Related Art

Two conventional techniques exist to solve the problem of identifying, in complex applications running over a number of nodes or tiers and involving redundant clusters of nodes within the same tier, that a failure has occurred, the software process or hardware device responsible for the failure, and the application transactions impacted by the failure.

The first conventional technique involves component monitors that monitor software processes or hardware devices at an individual component level. For example, commercial component monitors are available for WebSphere® Application Server (WAS) (e.g., Introscope® and Tivoli® Monitoring for Web Infrastructure), and WebSphere® MQSeries® (MQ) (e.g., Tivoli® Monitoring for Business Integration and Omegamon® for MQ). WAS, WebSphere® MQSeries®, Tivoli® Monitoring for Business Integration, and Omegamon® for MQ are available from International Business Machines Corporation of Armonk, N.Y. Introscope® is available from Wily Technology, Inc. of Brisbane, Calif. In cases such as a UNIX server running on the Lightweight Directory Access Protocol (LDAP), customized component monitors are developed. Component monitors provide performance information about software components and detect some classes of software errors; however, when a software hang occurs, these monitors provide a "false positive" (i.e., the application is not available, but a failure is not detected). Further, component monitors provide inadequate or no information regarding which application transactions are impacted as a result of a failure.

The second conventional technique involves executing a series of synthetic transactions against a real production system to see whether the transactions produce a response that corresponds to a valid known state. This synthetic transaction technique suffers from a number of problems. First, synthetic transactions are not appropriate for all business applications (e.g., updating a bank balance). Second, once a failure is detected by the synthetic transaction technique, it is not easy to determine which node or software process is responsible for the failure. Third, when load balancing technologies direct transactions, it is difficult for the synthetic transaction technique to direct synthetic transactions to specific nodes to provide complete coverage of an infrastructure. Fourth, every distinct application architecture needs to have a synthetic transaction defined for it. Finally, because of all of the above, running synthetic transactions creates a substantial load.

Thus, there exists a need in the art to overcome the deficiencies and limitations described above.

SUMMARY OF THE INVENTION

In first embodiments, the present invention provides a method of determining an availability of an application in a computing environment, comprising:

determining a plurality of pairs of processes utilized by the application, wherein each pair includes a first process designated as a consumer process and a second process designated as a provider process, wherein the consumer process accesses a resource provided by the provider process;

initiating, by one process (CP) designated as the consumer process and included in a pair of the plurality of pairs, a diagnostic transaction between the CP and another process (PP) designated as the provider process and included in the pair, wherein the diagnostic transaction utilizes an application programming interface (API) of a plurality of APIs to open a connection between the CP and the PP and to request an access to a resource managed by the PP, the API utilized by the CP and the PP to perform any communication therebetween;

completing the diagnostic transaction via receiving, at the CP, a response from the PP providing the access, or via not receiving the response at the CP;

designating the PP as available to the application in response to the completing via the receiving the response, or as unavailable to the application in response to the completing via the not receiving the response;

repeating the initiating, the completing, and the designating until each pair of the plurality of pairs is utilized by the initiating, the completing, and the designating; and determining an availability of the application based on no process of the plurality of pairs being designated unavailable via the designating.

In second embodiments, the present invention provides a system for determining an availability of an application in a computing environment, comprising:

means for determining a plurality of pairs of processes utilized by the application, wherein each pair includes a first process designated as a consumer process and a second process designated as a provider process, wherein the consumer process accesses a resource provided by the provider process;

means for initiating, by one process (CP) designated as the consumer process and included in a pair of the plurality of pairs, a diagnostic transaction between the CP and another process (PP) designated as the provider process and included in the pair, wherein the diagnostic transaction utilizes an application programming interface (API) of a plurality of APIs to open a connection between the CP and the PP and to request an access to a resource managed by the PP, the API utilized by the CP and the PP to perform any communication therebetween;

means for completing the diagnostic transaction via receiving, at the CP, a response from the PP providing the access, or via not receiving the response at the CP;

means for designating the PP as available to the application in response to the completing via the receiving the response, or as unavailable to the application in response to the completing via the not receiving the response;

means for repeating the initiating, the completing, and the designating until each pair of the plurality of pairs is utilized by the initiating, the completing, and the designating; and means for determining an availability of the application based on no process of the plurality of pairs being designated unavailable via the designating.

In third embodiments, the present invention provides a computer program product comprising a computer-usable medium including computer-usable program code for determining an availability of an application in a computing environment, the computer program product including:

computer-usable code for determining a plurality of pairs of processes utilized by the application, wherein each pair includes a first process designated as a consumer process and a second process designated as a provider process, wherein the consumer process accesses a resource provided by the provider process;

computer-usable code for initiating, by one process (CP) designated as the consumer process and included in a pair of the plurality of pairs, a diagnostic transaction between the CP and another process (PP) designated as the provider process and included in the pair, wherein the diagnostic transaction utilizes an application programming interface (API) of a plurality of APIs to open a connection between the CP and the PP and to request an access to a resource managed by the PP, the API utilized by the CP and the PP to perform any communication therebetween;

computer-usable code for completing the diagnostic transaction via receiving, at the CP, a response from the PP providing the access, or via not receiving the response at the CP;

computer-usable code for designating the PP as available to the application in response to the completing via the receiving the response, or as unavailable to the application in response to the completing via the not receiving the response;

computer-usable code for repeating the initiating, the completing, and the designating until each pair of the plurality of pairs is utilized by the initiating, the completing, and the designating; and computer-usable code for determining an availability of the application based on no process of the plurality of pairs being designated unavailable via the designating.

In fourth embodiments, the present invention provides a method for deploying computing infrastructure, comprising integrating computer-readable code into a computing system, wherein the code in combination with the computing system is capable of performing a process of determining an availability of an application in a computing environment, the process comprising:

determining a plurality of pairs of processes utilized by the application, wherein each pair includes a first process designated as a consumer process and a second process designated as a provider process, wherein the consumer process accesses a resource provided by the provider process;

initiating, by one process (CP) designated as the consumer process and included in a pair of the plurality of pairs, a diagnostic transaction between the CP and another process (PP) designated as the provider process and included in the pair, wherein the diagnostic transaction utilizes an application programming interface (API) of a plurality of APIs to open a connection between the CP and the PP and to request an access to a resource managed by the PP, the API utilized by the CP and the PP to perform any communication therebetween;

completing the diagnostic transaction via receiving, at the CP, a response from the PP providing the access, or via not receiving the response at the CP;

designating the PP as available to the application in response to the completing via the receiving the response, or as unavailable to the application in response to the completing via the not receiving the response;

repeating the initiating, the completing, and the designating until each pair of the plurality of pairs is utilized by the initiating, the completing, and the designating; and determining an availability of the application based on no process of the plurality of pairs being designated unavailable via the designating.

Advantageously, the availability determination technique described herein provides an accurate and reliable diagnostic test to determine the availability of a software process utilized by an application. Further, the present invention provides a general technique for accurately and automatically diagnosing end-to-end availability of any customer-defined application transaction while avoiding indications of false positives. Since the technique described herein is lightweight, it can be executed more frequently than conventional synthetic transaction schemes. Still further, the present invention is capable of automatically isolating an application's failure to an individual software process. Yet further, the diagnostic tests described herein can be directed to specific nodes, even if the computing environment employs redundancy.

BRIEF DESCRIPTION OF THE DRAWINGS

FIG. 3D is an adjacency matrix derived from the directed graph of FIG. 3B, in accordance with embodiments of the present invention.

FIG. 4B is an adjacency matrix derived from the directed graph of FIG. 4A, in accordance with embodiments of the present invention.

FIG. 4C depicts a union of the adjacency matrices in FIGS. 3D and 4B, in accordance with embodiments of the present invention.

FIG. 5B is an update of the adjacency matrix of FIG. 3D reflecting an impact of the process failure of FIG. 5A, in accordance with embodiments of the present invention.

FIG. 6B depicts an adjacency matrix derived from the directed graph of FIG. 6A, in accordance with embodiments of the present invention.

DETAILED DESCRIPTION OF THE INVENTION

The present invention provides an automated approach to diagnosing the availability of applications by detecting that an application failure has occurred, and detecting an individual process utilized by one or more applications that is responsible for the failure. Further, the technique disclosed herein identifies applications that are impacted by a failed process, and re-routes workload away from the failed process in operational environments where alternate paths are available. The aforementioned functions are a pre-requisite to an autonomic (i.e., self-healing) approach for recovering from application failure.

Figure 1A:
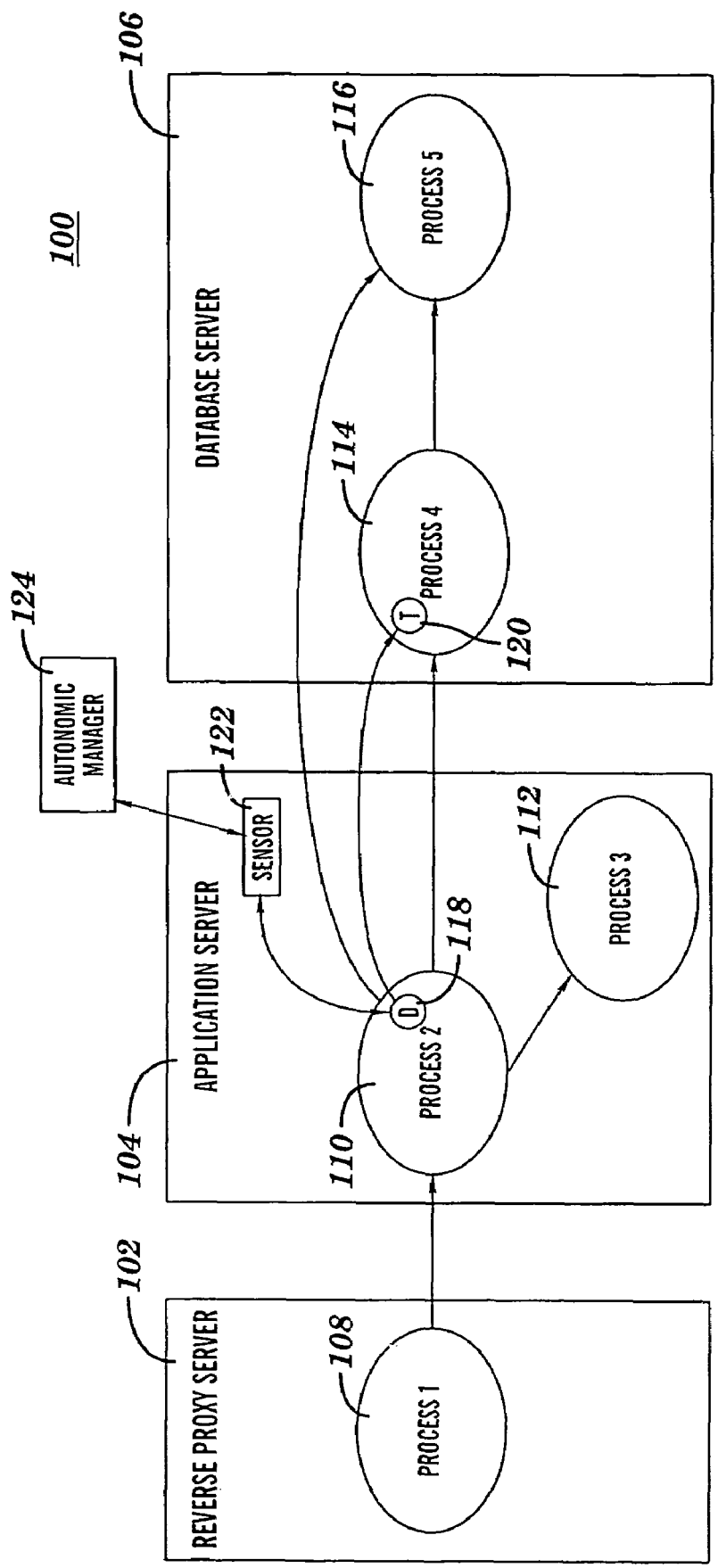
FIG. 1A is a block diagram of a system for determining application availability, in accordance with embodiments of the present invention.

FIG. 1A is a block diagram of a system for determining application availability, in accordance with embodiments of the present invention. System 100 includes the architecture of a multi-tier application (e.g., a client/server application) being monitored for its availability by the techniques disclosed herein. System 100 includes a reverse proxy server 102, an application server 104, and a database server 106. A software process 108 residing in server 102 communicates with software process 110 residing in server 104. As used herein, a software process is defined as a running instance of a computer program utilized by the application being monitored, including all variables and other state information, where the running instance performs a task. Typically, a software process is a unit of work managed by operations staff, and can be stopped, started or have its configuration parameters modified during its execution. A software process is, for example, a process in a UNIX environment or an address space in a z/OS® environment. Hereinafter, for simplicity, a software process is referred to as a process.

Process 110 communicates with process 112, which resides in server 104. Process 110 also communicates with process 114, which resides in server 106. Further, process 114 communicates with process 116 residing in server 106. Processes 108, 110, 112, 114, and 116 are components of the application whose architecture is depicted in FIG. 1A.

Communications between processes in FIG. 1A include, for example, one process (i.e., a consumer process) requesting access to one or more resources managed by another process (i.e., a provider process). When multiple processes exist in one server (e.g., processes 110, 112 in server 104), a multitasking operating system (not shown) provides the appearance of simultaneous execution of the processes by switching between their executions on a central processing unit (not shown).

Each of the processes of FIG. 1A includes one or more components. For example, process 110 includes driver component 118, which communicates with test component 120 residing in process 114. Driver component 118 initiates a diagnostic transaction that tests the connection between process 110 and process 114, thereby determining the availability of process 114, and facilitating determining whether a failure has occurred in the application being monitored. The diagnostic transaction is described in more detail below (see, e.g., FIGS. 1B and 2).

Driver component 118 is instantiated by a sensor 122, and returns the result of the diagnostic transaction to sensor 122. Sensor 122 is instantiated by an autonomic manager 124, and returns the result of the diagnostic transaction to autonomic manager 124. Autonomic manager resides on a management server (not shown). Autonomic manager 124 provides functions that facilitate the ability of computing system 100 to automatically identify a failure related to a process or server, and automatically take actions (a.k.a. self-healing actions) in response to the failure to maintain effective functioning of the system. Examples of functions performed by autonomic manager 124 include: (1) maintaining a topology of each application being monitored for availability; (2) maintaining a consolidated view of the set of connections between processes that need to be monitored; (3) analyzing the impact of a process or server failure on the availability of an application; (4) preventing additional workload from being sent to a failed process or server; and (5) initiating recovery and restart actions in response to a process or server failure.

The management server that includes autonomic manager 124 may be configured to be highly available, and therefore may be capable of running on clustered servers (not shown), and be capable of running across multiple data centers. Such a clustered configuration is typically part of, or feeds events into, an organization's central management console. Further, the clustered server configuration is enhanced so that each of the servers in the cluster monitors the other servers in the cluster to ensure that the autonomic manager instances do not fail. A central management console is, for example, Tivoli Enterprise Console, which is available from International Business Machines Corporation.

Although not shown in FIG. 1A, driver components and test components are included in other pairs of processes so that the connection between the processes of each pair can be tested. For example, a driver component (not shown) in process 108 and a test component (not shown) in process 110 utilize a diagnostic transaction to test the connection between processes 108 and 110. Further, server 102 and server 106 each include a sensor (not shown) that communicates with each server's respective one or more driver components. Like sensor 122, the sensors in server 102 and 106 communicate with autonomic manager 124. Although not shown, each sensor, including sensor 122, communicates with the one or more test components residing in the server that includes the sensor (e.g., to instantiate the test components).

The present invention contemplates other configurations of servers in system 100. For instance, one or more servers of types already in system 100 and/or of types not represented in FIG. 1A can be added to system 100 (e.g., system 100 can include multiple application servers). Further, any server in FIG. 1A can be replaced with another type of server. Still further, system 100 is not limited to servers, and may include one or more nodes that are servers and/or one or more nodes that are non-server devices. Non-server devices include, for example, firewalls, load-balancing switches (i.e., application content switches), cryptographic coprocessors, intrusion detection appliances, and web caching devices. As used herein, a node is defined as a physical device attached to a network or another device (e.g., a cryptographic coprocessor is attached to a server PCI bus, and is therefore not directly network accessible). If system 100 includes non-server devices, a diagnostic transaction can test the connection between non-server devices or between a server and a non-server device, using the techniques described below.

System 100 can be extended to include architectures of multiple applications, whose processes reside on the nodes of system 100. The availability technique described below can determine which of the multiple applications are impacted by a failure of a process. Moreover, an application included in system 100 may be a single or multi-tiered application, and redundancy of one or more nodes may be built into system 100.

Figure 1B:
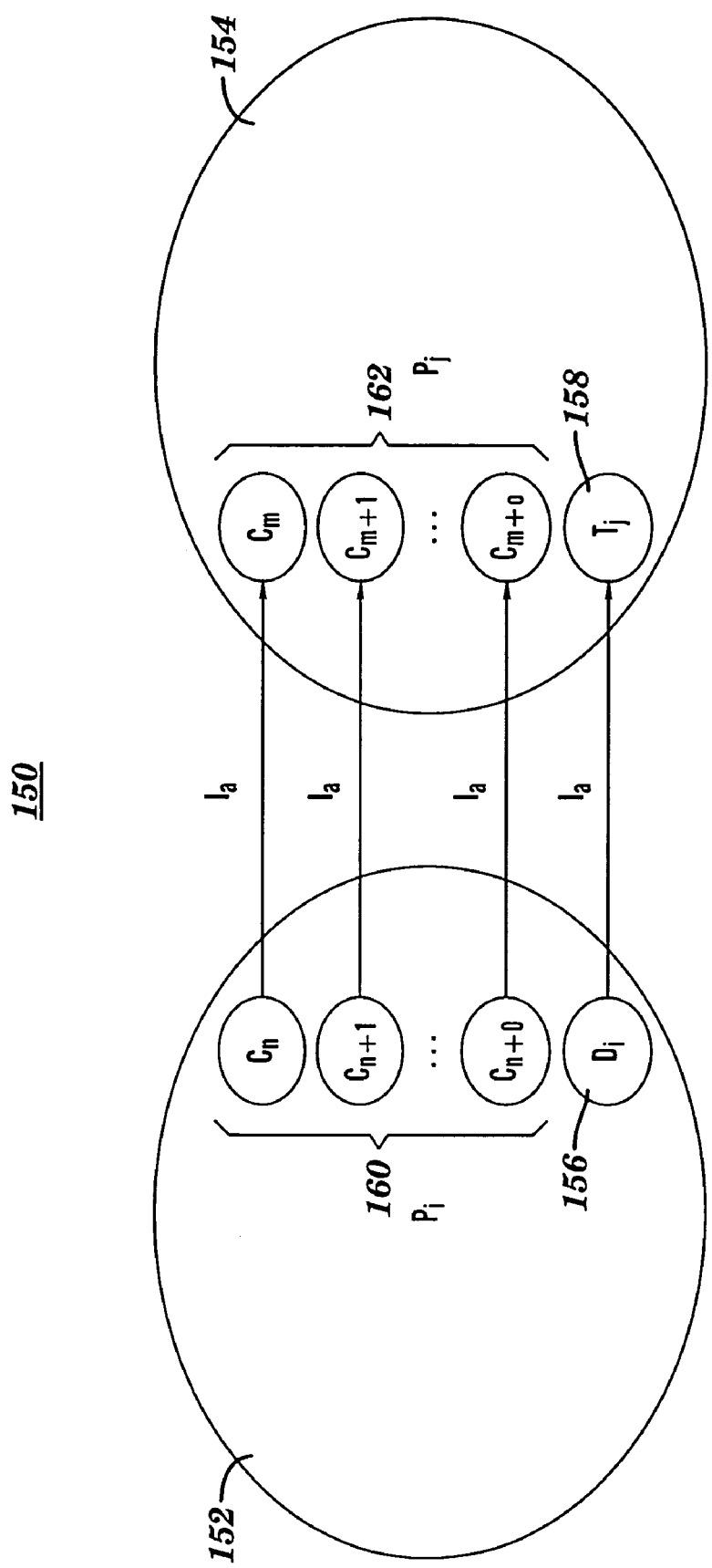
FIG. 1B depicts connections between components of a pair of processes of the system of FIG. 1A, in accordance with embodiments of the present invention.

FIG. 1B depicts connections between components of a pair 150 of processes of the system of FIG. 1A, in accordance with embodiments of the present invention. As used herein, a pair of processes (a.k.a., process pair) is defined as a consumer process and a provider process. Further, as used herein, a consumer process (a.k.a. client process) is defined to be a process initiating a request for one or more resources directed to another process via an application programming interface (API) or application level protocol. Still further, as used herein, a provider process (a.k.a. server process) is defined to be a process that responds to a request to provide access to one or more resources requested by another process. Any communication between a pair of processes of an application is initiated by a consumer process and is directed to a provider process.

Process pair 150 includes consumer process $P_i$ 152 and provider process $P_j$ 154. Process 152 requests resources from process 154 via API or application level protocol $I_a$. Hereinafter, it is to be understood that a reference to an API refers to an API or an application level protocol. Consumer process 152 includes a driver component 156, and provider process 154 includes a test component 158. A first set 160 of other application components is included in consumer process 152 and a second set 162 of other application components is included in provider process 154. First set 160 includes components $C_n, C_{n+1}, \ldots, C_{n+o}$, which correspond in a one-to-one manner with components $C_m, C_{m+1}, \ldots, C_{m+o}$, which are included in second set 162. Each component of first set 160 accesses services of its corresponding component in second set 162 via $I_a$. Driver component 156 is an infrastructure component embedded in process 152 that is used to drive the connection between $P_i$ and $P_j$ using $I_a$. Driving a connection between processes is discussed below relative to FIG. 2.

Figure 2:
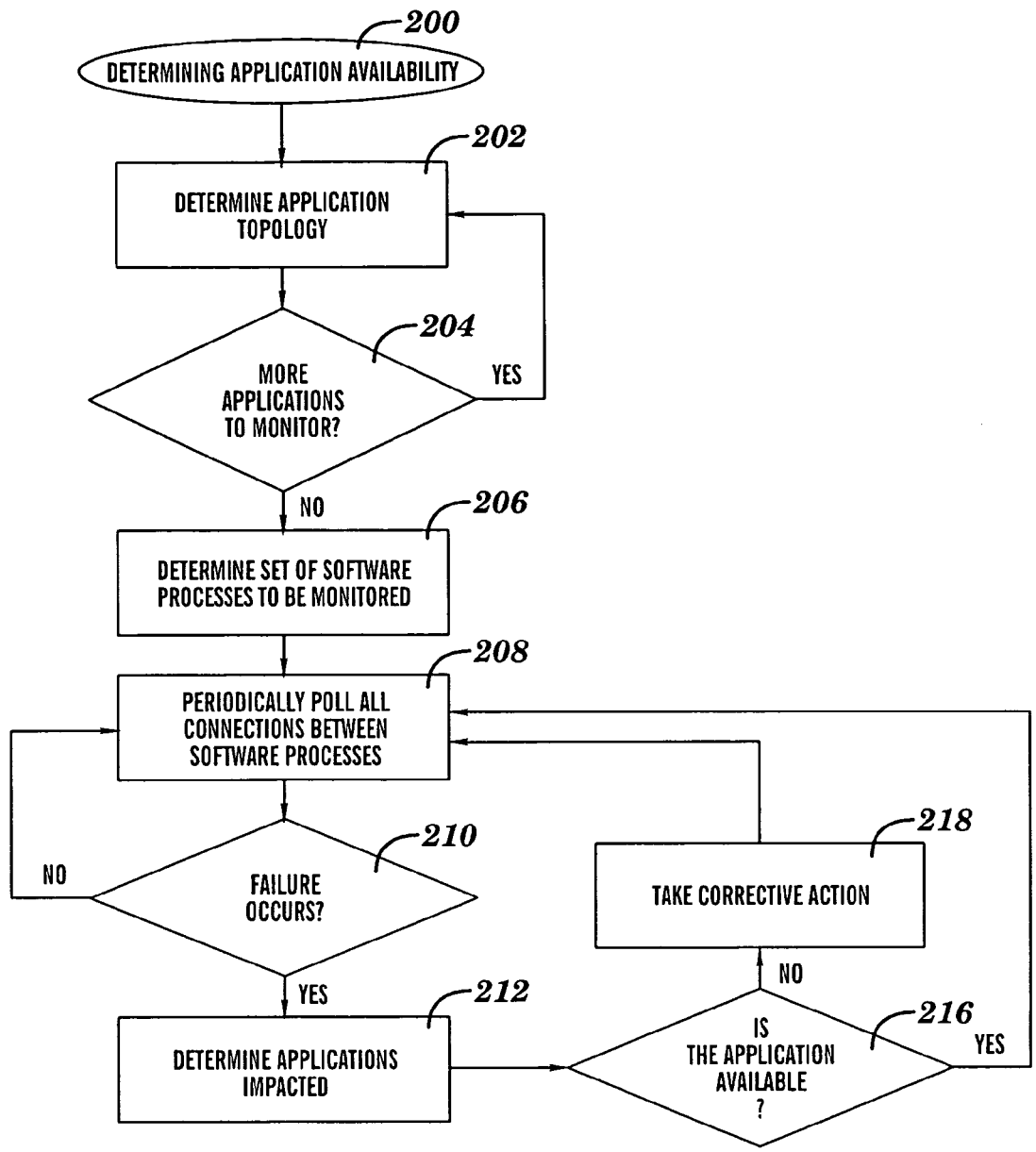
FIG. 2 is a flow chart of a method for determining application availability, which is implemented in the system of FIG. 1A, in accordance with embodiments of the present invention.

FIG. 2 is a flow chart of a method for determining application availability, which is implemented in the system of FIG. 1A, in accordance with embodiments of the present invention. The process of determining application availability begins at step 200. In step 202, the topology of an application included in system 100 (see FIG. 1A) is determined. The topology of the application includes (1) the processes utilized by the application, denoted $P_1$ to $P_n$; (2) the connection protocols or APIs used by the processes to communicate with each other, where each pair of processes that communicate utilize a particular API to enable communication; (3) the servers on which processes $P_1 \ldots P_n$ are deployed and run, and whether software clustering is employed; and (4) all configuration data specific to each process of $P_1 \ldots P_n$, which includes general configuration settings, as well as application-specific deployment-related artifacts and configuration parameters. In one embodiment, the topology determined in step 202 is defined in an XML file.

An application topology can be represented as a set of triplets $\{P_i, I_a, P_j\}$, where $P_i$ is a consumer process included in the processes $P_1 \ldots P_n$, $P_j$ is a provider process included in the processes $P_1 \ldots P_n$, $I_a$ is the API utilized in any communication between $P_i$ and $P_j$, $1 \leq i, j \leq n$, and $i \neq j$. The subscript in $I_a$ is unbounded because a theoretically infinite number of APIs can be in use between $P_i$ and $P_j$. For practical purposes, an environment may have hundreds to thousands of APIs in use. If it is assumed that (1) each process pair has only one API in use between the processes of the pair (which is usually the case), and (2) there are no loops (i.e., $i<j$ for all i and j), then the maximum number of APIs is $(n-1)*n/2$.

The set of triplets $\{P_i, I_a, P_j\}$ can be converted into a directed graph where $P_i$ and $P_j$ represent vertices of the directed graph and the $I_a$ values represent the edges of the graph.

As one example, application topology information determined in step 202 is collected by an Application Response Measurement (ARM) API. ARM is a standard provided by The Open Group of Reading, United Kingdom. The ARM API is implemented by products such as Tivoli Monitoring for Transaction Performance (TMTP) and Enterprise Workload Manager (EWLM), which are available from International Business Machines Corporation. In the case of EWLM, the ARM API is implemented in underlying middleware products such as HTTP Server, WebSphere® Application Server, DB2®, and MQSeries®, which are available from International Business Machines Corporation.

System 100 (see FIG. 1A) can be included in a distributed computing environment. In this case, a calling hierarchy is also determined in step 202 by, for example, the ARM API. A calling hierarchy of an application is a sequence in which methods are invoked by the application. In one example, a calling hierarchy is restricted to operationally significant methods, which are methods that invoke APIs involving external processes. For instance, in a Java® environment running under WebSphere® Application Server (WAS), the calling hierarchy would include calls to an MQSeries® process external to WAS, wherein the calls utilize a Java® Message Service (JMS) API. WAS is software that manages e-business applications, and MQSeries® is software that provides message queuing services.

The ARM API builds the calling hierarchy by the use of correlators. Each method call passes a parent correlator to the application. The application also receives a child correlator in a response to the method call. A call tree generated using the parent and child correlators includes the calling hierarchy and the timing of the method calls.

As one example, an ARM Management Agent (not shown) residing in server 104 (see FIG. 1A) passes ARM information, including correlators, to sensor 122 (see FIG. 1A). Sensor 122 (see FIG. 1A) sends "first of a kind" (FOAK) application configurations to autonomic manager 124 (see FIG. 1A). A FOAK configuration is an application topology that is being detected by a sensor for the first time. A sensor can identify a configuration as a FOAK configuration by comparing the configuration to the sensor's maintained knowledge of the topology of applications relative to the node on which the sensor resides. FOAK configurations include: (1) an application that is newly detected by a sensor because a node is newly added to an existing cluster, or because the application is newly identified by the present invention as an application to be monitored; and (2) a process or a communication with an existing process that is newly added to an application.

Sending only FOAK configurations from the sensors to the autonomic manager ensures that massive amounts of data are not transmitted to the autonomic manager as a result of every transaction that reports its topology. Further, the automatic identification and transmission of FOAK configurations advantageously avoids the need for error-prone manually defined application topologies.

If inquiry step 204 determines that an additional one or more other applications included in system 100 are to be monitored for availability, and have topologies that have not yet been determined by step 202, then the process repeats starting at step 202 to determine the topology of one of the additional applications. If step 204 determines that no applications remain to be processed by step 202, then the application availability process continues with step 206.

Although not shown on FIG. 2, steps 202, 204 and 206 are performed on a continual basis in parallel with polling activities, which are described in subsequent steps starting at step 208. In other words, a FOAK topology can be detected at any time during the process of FIG. 2, and in response to that detection, the FOAK topology is propagated to autonomic manager 124 (see FIG. 1A), which re-executes steps 202, 204 and 206.

In step 206, the one or more application topologies determined in step 202, or the directed graphs representing the application topologies, are each converted to an adjacency matrix that includes rows and columns corresponding to the provider processes and consumer processes, respectively. A value of a first pre-defined set of values (e.g., a non-zero value) appears in an adjacency matrix at row i and column j to indicate a particular API that is used in a communication between the j-th consumer process and the i-th provider process. Hereinafter, a value of the first pre-defined set is referred to as a non-zero value. A value of a second pre-defined set of values (e.g., a zero value) in the adjacency matrix indicates that no communication is occurring between the consumer process and provider process indicated by the column and row associated with the value. Hereinafter, a value in the second pre-defined set is referred to as a zero value.

Step 206 also forms a union of all the adjacency matrices generated from the application topologies of step 202. The non-zero values of the union of the adjacency matrices indicate the set of processes that are to be monitored. Adjacency matrices are described below relative to FIGS. 3D and 4B, and a union of adjacency matrices is depicted in FIG. 4C.

Periodic polling of connections between processes is initialized and periodic polling begins in step 208. Autonomic manager 124 (see FIG. 1A) instantiates sensors (e.g., sensor 122 of FIG. 1A) residing in nodes of system 100 (see FIG. 1A) (e.g., servers 102, 104, 106 of FIG. 1A), and notifies each sensor of the APIs to be utilized for the monitoring of the node on which the sensor resides. Each sensor instantiates one or more driver components (e.g., driver component 118 of FIG. 1A) and one or more test components (e.g., test component 120 of FIG. 1A), which reside in the node on which the sensor resides.

Each driver component (e.g., driver component 118 of FIG. 1A) of a consumer process initiates a diagnostic transaction that utilizes a distinct API of the plurality of APIs to test a connection between the consumer process and a provider process invoked by the consumer process. As used herein, testing a connection between a consumer process and a provider process is equivalent to testing the availability of the provider process. The test of the connection includes (1) opening a connection between the consumer process and the provider process, and (2) requesting access to one or more resources managed by the provider process. The aforementioned actions (1) and (2) utilize the same API that an application being monitored uses for any of the application's transactions between the consumer process and the provider process.

The diagnostic transaction is directed to a test component (e.g., test component 120 of FIG. 1A) included in the provider process. The test component includes all the resources necessary to execute the code from the driver component, and provide a response. If the provider process is available, the test component's response to the driver component provides the requested access to the one or more resources, and validates the functionality of the provider process. If the provider process is unavailable, the driver component receives no response from the test component.

In certain aspects, a diagnostic transaction mimics other, non-diagnostic transactions of an application being monitored, which allows the present invention to monitor any arbitrary customer-defined transaction while avoiding the costly setup of synthetic transactions. Differences, however, do exist between diagnostic and non-diagnostic transactions. Diagnostic transaction functionality that is not shared by non-diagnostic transactions include (a) detecting a failure isolated to particular software process and reporting that failure to the aforementioned sensor and autonomic manager, which analyze the failure and initiate corrective action(s); (b) distinguishing an unavailable process from other factors that may cause a failed transaction (e.g., faulty application code, user error, etc.); (c) ascertaining, while coupled with correlation of events over time or from other client processes, whether there is an application failure or not; and (d) isolating failure to a single process without initially determining whether the failure is caused by faulty business logic. Function (d) is a distinguishing feature of diagnostic transactions because business logic is absent from diagnostic transactions and present in non-diagnostic transactions.

The availability of any arbitrary customer-defined application transaction can be determined by executing a diagnostic transaction for each of the connections utilized by the application. Moreover, to test the availability of multiple applications, the process of FIG. 2 executes a single diagnostic transaction for each communication connection between processes of every process pair. For example, if application X utilizes the connection between process P1 and process P2 via API I1, and application Y utilizes the same P1 to P2 connection via API I2, the P1 to P2 connection needs to be tested with a diagnostic transaction only once to facilitate determining the availability of both applications X and Y.

The following pseudo-code is an example of an initiation of a diagnostic transaction by a consumer process. The diagnostic transaction tests the establishment of a connection between the consumer process and a relational database via the JDBC® API.

```
DataSource = Context.getDataSource ("MyDataSource");
// Locate database
SQLConnection = DataSource.getConnection (username, password);
// Establish connection to database
Is (SQLConnection.aValidConnection( )) {
    // Validate that a JDBC ® connection can be established to the database
        // DB2 ® in the provider process is UP
} else {
        // DB2 ® in the provider process is DOWN
}
```

In one embodiment, a driver component of a consumer process being monitored includes (1) a driver manager that returns results from the connection tests of step 208 to a sensor residing in the same node that includes the consumer process, and (2) one or more driver routines, one routine for each of the distinct APIs associated with the connections to be tested. Further, a test component included in a provider process being monitored includes (1) the resources necessary to validate the functionality of the provider process, and (2) a test manager that initializes the resources, and which is in communication with a sensor residing in the same node that includes the provider process.

The test component contents vary according to the particular provider process on which it resides. For example, if the provider process is a relational database process (e.g., DB2®), the test component may contain tables, stored procedures, or other database objects. As another example, if the provider process is a message queue (e.g., WebSphere® MQ, which is available from International Business Machines Corporation), the test component may contain queue managers, queues, and transmission agents.

After the test of a connection (e.g., the connection between driver component 118 and test component 120 of FIG. 1A), the driver component reports the result of the test (i.e., whether the connection is available) to the associated sensor (e.g., sensor 122 of FIG. 1A). As used herein, the availability of the connection is equivalent to the availability of the provider process that includes the test component utilized by the test. The sensor returns the test result to autonomic manager 124 (see FIG. 1A). Each time a connection is tested, a status adjacency matrix is updated to indicate that a connection is available or unavailable based on the test.

The testing of a connection described herein is also known as driving the connection or pinging the connection at an application level. Being a ping at an application level, the test for availability described herein involves monitoring a provider process by invoking the public methods of the provider process (i.e., the API utilized in communications with the provider process), to verify that the provider process is functioning in the manner expected by the consumer of its services (i.e., the consumer process). The connection between the consumer and provider processes in an application level ping does not require a network (e.g., the consumer and provider process pair being monitored can be located on the same server).

It should be noted that an application level ping differs from a network level ping (e.g., Internet Control Message Protocol (ICMP)). The provider process associated with a network level ping must be capable of supporting TCP/IP and must be listening on a nominated TCP/IP port. An application level ping does not have these restrictions, and thus is capable of detecting faults on any process running on a node, rather than only processes that are listening on TCP/IP ports.

Inquiry step 210 determines if a process has experienced a failure based on the availability diagnosis of step 208. If all processes utilized by applications are functioning properly (i.e., are available) based on the connection tests of step 208, then no failure of an application is detected by autonomic manager 124 (see FIG. 1A), and the process repeats the polling of connections at step 208. If one or more tests of connections determine that one or more processes are unavailable to their respective application(s), then a failure affecting one or more applications is determined by autonomic manager 124 (see FIG. 1A), and the process continues with step 212.

Step 212 determines the one or more applications impacted by the failure identified in step 210. The union of adjacency matrices formed in step 206 is compared to the one or more processes identified as failed processes in step 210 to determine which applications need to utilize the failed process(es). The one or more applications that need to utilize the failed process(es) are identified as the application(s) impacted by the identified failure(s). The determination of the impacted applications is performed by autonomic manager 124 (see FIG. 1A).

Step 216 determines if the applications determined in step 212 are available. The step 216 determination of availability is equivalent to a determination of availability of an information technology (IT) service. An IT service is an application whose availability is determined by the performance standards of an end user, without regard to the number of tiers used by the application, or the amount of redundancy employed. An IT service includes computer programs distributed across multiple systems, processes and threads. The process of the present invention determines that an application is available only if an end user's performance standards also determine that the corresponding IT service is available. An application is available if step 210 detected no failures in the processes utilized by the application.

If step 216 determines that the applications determined by step 212 are available, then the process repeats starting at step 208 (i.e., periodic polling continues). Otherwise, corrective action is taken in step 218 to address the unavailability of the application(s). If one or more applications are unavailable, step 218 can, for example, take a failed server offline, prevent work associated with an application being monitored from being sent to a failed process, start a new software process to provide a workaround for the failed process, provision a new server to run the failed server or failed process, or restart a failed process if the failure is determined to be transient (i.e., restartable).

Step 218 can also respond to unavailability determined in step 216 by re-routing workload associated with the impacted application(s) determined in step 212 away from the one or more processes identified as failed processes in step 210. The re-routing decisions are automatically made by autonomic manager 124 (see FIG. 1A), and are implemented by mechanisms (e.g., effectors) residing on nodes of system 100 (see FIG. 1A). For example, if redundancy were built into system 100 of FIG. 1A so that a clone of application server 102 was part of the system, an effector residing on reverse proxy server 102 (see FIG. 1A) is notified about the transactions that use a failed process of application server 104 (see FIG. 1A). The effector modifies software on server 102 (see FIG. 1A) to direct all HTTP requests requiring the failed process to the clone (not shown in FIG. 1A) of application server 102. Re-routing workload away from the failed process prevents additional transactions from failing.

Furthermore, performance modeling can determine if one or more applications are unavailable due to insufficient capacity in system 100 (see FIG. 1A). In this case, step 218 can, for instance, add servers to the system to increase capacity.

First Application Example

Figure 3A:
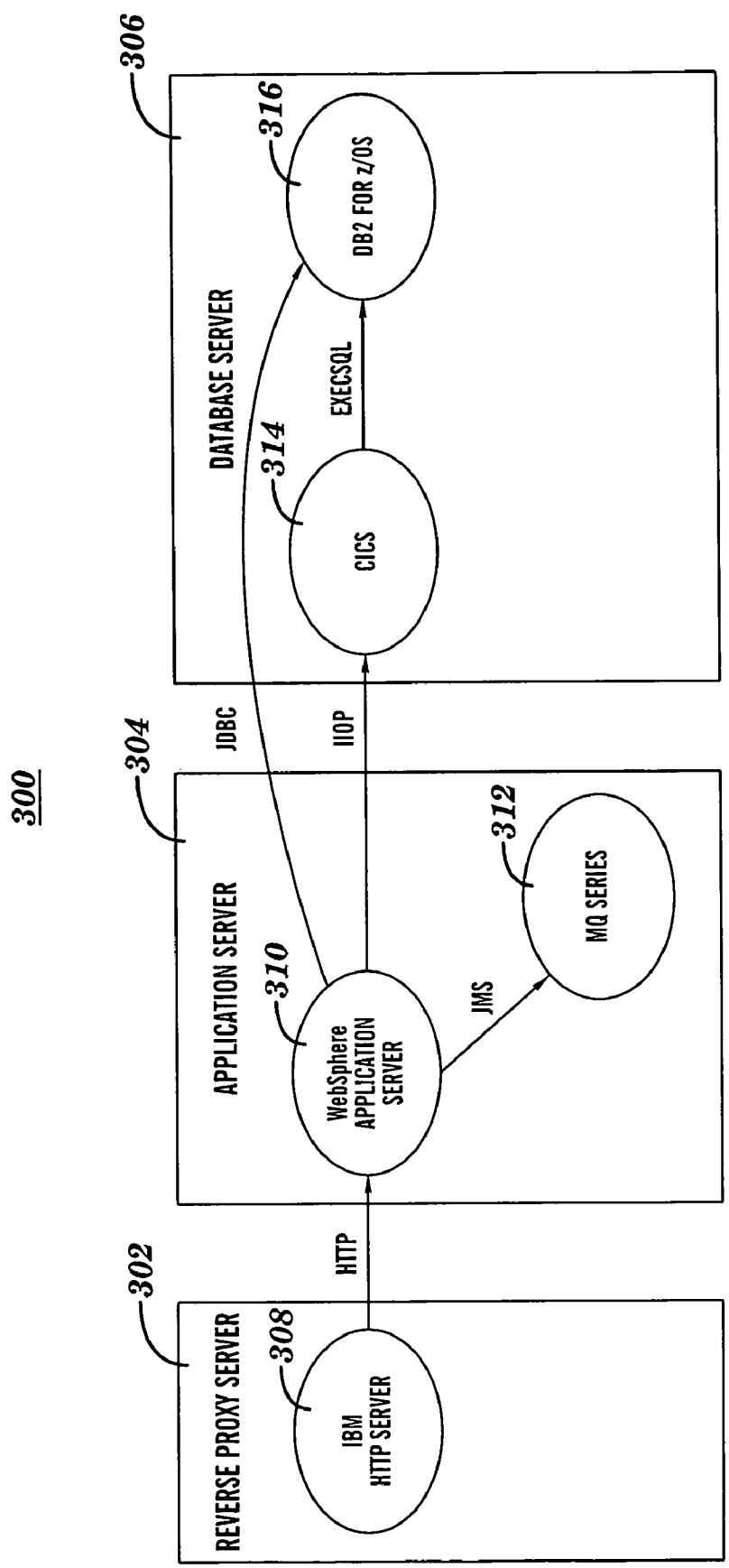
FIG. 3A is a block diagram of an architecture of a first application included in the system of FIG. 1A, in accordance with embodiments of the present invention.

FIG. 3A is a block diagram of an architecture of a first application included in the system of FIG. 1A, in accordance with embodiments of the present invention. Application architecture 300 includes reverse proxy server 302, application server 304 and database server 306. Server 302 includes an IBM® HTTP Server process 308 that requests resources via HTTP from a WebSphere® Application Server process 310 running on a Java Virtual Machine (JVM®) residing on server 304. Process 310 requests resources (1) via a JMS API from a MQSeries® process 312, which also resides on server 304, (2) via a IIOP® API from a CICS® process 314 residing on server 306, and (3) via a JDBC® API from a DB2® for z/OS® process 316 residing on server 306. Process 314 requests resources via an EXECSQL API from process 316.

Figure 3B:
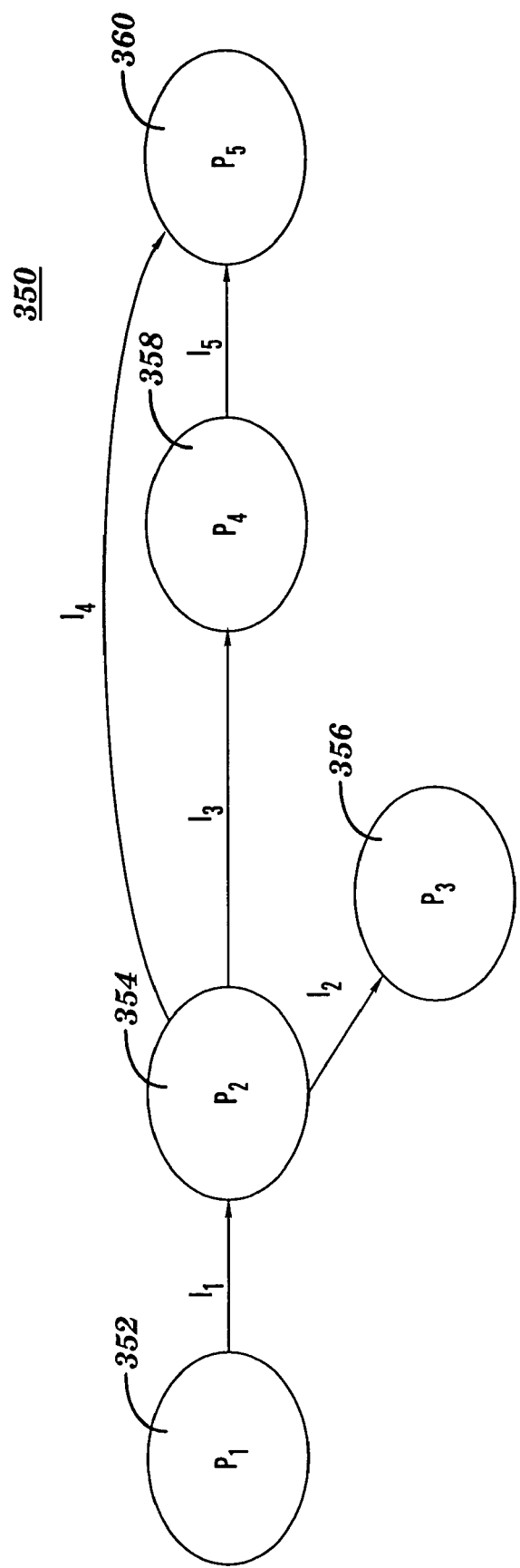
FIG. 3B depicts a directed graph representing the processes of the application of FIG. 3A, in accordance with embodiments of the present invention.

FIG. 3B depicts a directed graph representing the processes of the application of FIG. 3A, in accordance with embodiments of the present invention. Directed graph 350 includes vertices $P_1$ 352, $P_2$ 354, $P_3$ 356, $P_4$ 358, and $P_5$ 360, which correspond respectively to processes 308, 310, 312, 314, and 316 of FIG. 3A. Edges $I_1$, $I_2$, $I_3$, $I_4$, and $I_5$ represent the APIs utilized in the process pairs $(P_1,P_2)$, $(P_2,P_3)$, $(P_2,P_4)$ $(P_2, P_5)$, and $(P_2,P_5)$, respectively. In this example, $I_1$, $I_2$, $I_3$, $I_4$, and $I_5$ represent the APIs HTTP Server, JMS, IIOP®, JDBC® and EXECSQL, respectively.

Figure 3C:
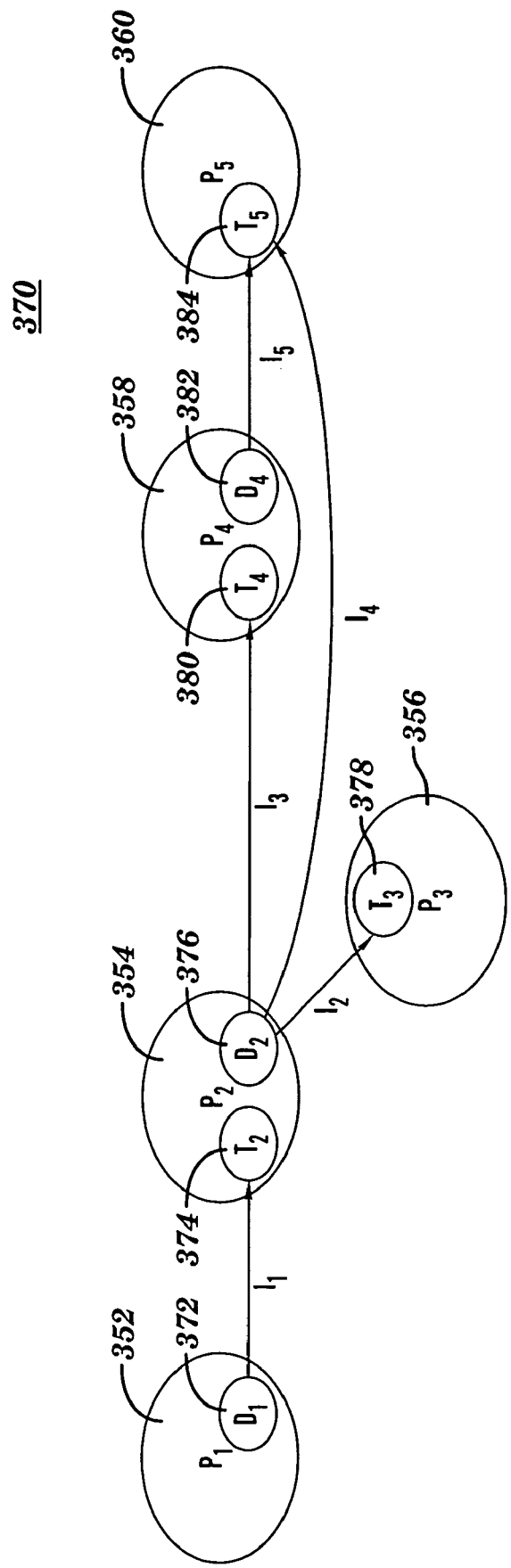
FIG. 3C is a modification of the directed graph of FIG. 3C that illustrates diagnostic transactions, in accordance with embodiments of the present invention.

FIG. 3C is a modification of the directed graph of FIG. 3C that illustrates diagnostic transactions, in accordance with embodiments of the present invention. FIG. 3C depicts directed graph 370, which includes directed graph 350 (see FIG. 3B). Directed graph 370 includes vertices $P_1$ 352, $P_2$ 354, $P_3$ 356, $P_4$ 358, and $P_5$ 360, which correspond to processes of FIG. 3A, as described above relative to FIG. 3B. A diagnostic transaction utilizing API $I_1$ is illustrated between driver component $D_1$ 372 residing in $P_1$ and test component $T_2$ 374 residing in $P_2$. A complete list of diagnostic transactions depicted in FIG. 3C is shown in Table 1. Each row of Table 1 represents a diagnostic transaction comprising $D_i$ requesting resources managed by $T_j$ via API $I_a$.

TABLE 1

| Driver component ($D_i$) | Driver component resides in ($P_i$) | API used to test connection ($I_a$) | Test component ($T_j$) | Test component resides in ($P_j$) |
|---|---|---|---|---|
| $D_1$ 372 | $P_1$ 352 | $I_1$ | $T_2$ 374 | $P_2$ 354 |
| $D_2$ 376 | $P_2$ 354 | $I_2$ | $T_3$ 378 | $P_3$ 356 |
| $D_2$ 376 | $P_2$ 354 | $I_3$ | $T_4$ 380 | $P_4$ 358 |
| $D_2$ 376 | $P_2$ 354 | $I_4$ | $T_5$ 384 | $P_5$ 360 |
| $D_4$ 372 | $P_4$ 358 | $I_5$ | $T_5$ 384 | $P_5$ 360 |

When a diagnostic transaction determines that a connection $D_i$ to $T_j$ using $I_a$ is functioning correctly, the response returned by $T_j$ to $D_i$ is 1; otherwise 0 is returned. All diagnostic transactions must return a 1 for the application to be available. That is, all the diagnostic transaction results are ANDed together to determine end-to-end availability of an application.

FIG. 3D is an adjacency matrix derived from the directed graph of FIG. 3B, in accordance with embodiments of the present invention. As used herein, an adjacency matrix is formed with each column representing a consumer process of an application, each row representing a provider process of the application, and each non-zero element indicating an API utilized by the consumer process and the provider process designated by the respective column and row of the non-zero element. A zero element in an adjacency matrix indicates that no communication is directed between the consumer process and provider process indicated by the column and row of the zero element.

An adjacency matrix 390 includes zero elements and non-zero elements corresponding to the rows of provider processes of an application A1 and the columns of consumer processes of application A1. A non-zero element $I_a$ represents the API that is used in communications, including diagnostic transactions, between the consumer process and provider process indicated by the column and row, respectively, that correspond to the non-zero element. For example, in adjacency matrix 390, the element at the intersection of row $P_2$ and column $P_1$ is $I_1$, which indicates that the API $I_1$ is used by any communication between the consumer process $P_1$ and the provider process $P_2$. A zero element in adjacency matrix 390 indicates that application A1 does not include communications between the processes indicated by the corresponding row and column. For instance, in adjacency matrix 390, the zero at the intersection of row $P_2$ and column $P_3$ indicates that consumer process $P_3$ does not request any resources from provider process $P_2$.

Second Application Example

Figure 4A:
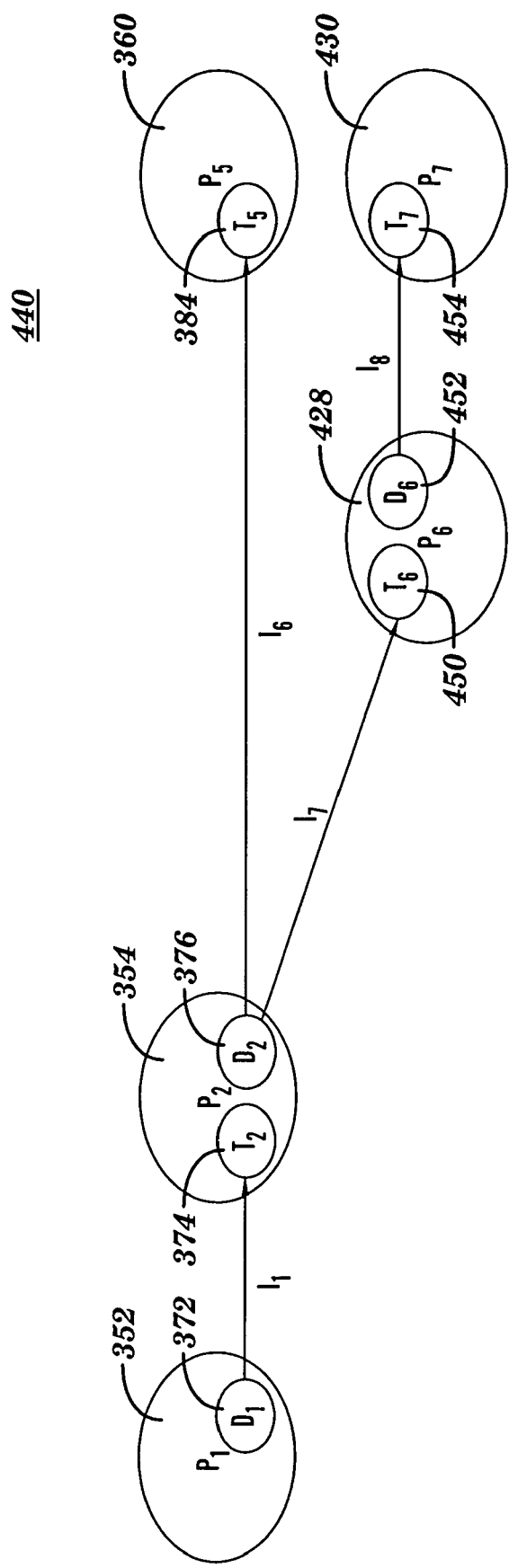
FIG. 4A is a directed graph representing the processes of a second application included in the system of FIG. 1A, in accordance with embodiments of the present invention.

FIG. 4A is a directed graph representing the processes of a second application included in the system of FIG. 1A, in accordance with embodiments of the present invention. A second application A2 is represented by directed graph 440. Application A2 utilizes processes represented by vertices $P_1$ 352, $P_2$ 354, $P_5$ 360, $P_6$ 428, and $P_7$ 430. Processes 308, 310 and 316 of FIG. 3A respectively correspond to $P_1$ 352, $P_2$ 354 and $P_5$ 360. Processes corresponding to $P_6$ 428 and $P_7$ 430 reside in an additional server not shown in FIG. 3A. Driver components initiate diagnostic transactions that elicit responses from corresponding test components, as described above. Table 2 summarizes the diagnostic transactions depicted in FIG. 4A.

TABLE 2

| Driver component ($D_i$) | Driver component resides in ($P_i$) | API used to test connection ($I_a$) | Test component ($T_j$) | Test component resides in ($P_j$) |
|---|---|---|---|---|
| $D_1$ 372 | $P_1$ 352 | $I_1$ | $T_2$ 374 | $P_2$ 354 |
| $D_2$ 376 | $P_2$ 354 | $I_6$ | $T_5$ 384 | $P_5$ 360 |
| $D_2$ 376 | $P_2$ 354 | $I_7$ | $T_6$ 450 | $P_6$ 428 |
| $D_6$ 452 | $P_6$ 428 | $I_8$ | $T_7$ 454 | $P_7$ 430 |

It should be noted that a single driver component-test component pair can be used in different applications while using a different API for each application, or the same APIs in each application. For example, both FIGS. 3C and 4A include driver component $D_2$ initiating a diagnostic transaction that requests one or more resources managed by test component $T_5$. The API used with $D_2$ and $T_5$ in FIG. 3C is $I_4$ while in FIG. 4A, the API is $I_6$.

Similar to FIG. 3C, when a diagnostic transaction of FIG. 4A determines that a connection $D_i$ to $T_j$ using $I_a$ is functioning correctly, the response returned by $T_j$ to $D_i$ is 1; otherwise 0 is returned. All diagnostic transactions must return a 1 for application A2 to be available. If any of the diagnostic transactions return a 0, then application A2 is unavailable. That is, all the diagnostic transaction results are ANDed together to determine end-to-end availability of an application.

FIG. 4B is an adjacency matrix derived from the directed graph of FIG. 4A, in accordance with embodiments of the present invention. Adjacency matrix 460 includes rows associated with provider processes utilized by application A2 and columns associated with consumer processes utilized by A2. Each non-zero element of adjacency matrix 460 designates the API utilized by the consumer process and provider process indicated by the respective column and row of the non-zero element. Each zero element of matrix 460 designates that no communication is performed between the processes indicated by the column and row that includes the zero element.

FIG. 4C is a union of the adjacency matrices in FIGS. 3D and 4B, in accordance with embodiments of the present invention. Forming a union of adjacency matrices associated with all applications being monitored for availability determines a minimum set of diagnostic transactions needed to test connections between every pair of processes utilized by one or more of the applications. For example, matrix 470 is the union of adjacency matrices 390 (see FIG. 3D) and 460 (see FIG. 4B). The number of non-zero elements in the union of adjacency matrices indicates the minimum number of diagnostic transactions needed. In this example, matrix 470 includes 7 non-zero elements, so the minimum number of diagnostic transactions required to test the connections utilized by the applications being monitored is 7. If multiple APIs appear in a single element of the union of adjacency matrices, that element is counted only once towards the calculation of the minimum number of diagnostic transactions. For instance, both APIs $I_4$ and $I_6$ appear in an element of matrix 470 corresponding to consumer process $P_2$ and provider process $P_5$, but only one of the APIs $I_4$ or $I_6$ needs to be utilized in a diagnostic transaction between $P_2$ and $P_5$ to determine if $P_5$ is available.

Example of an Application Impacted by a Failed Process

Figure 5A:
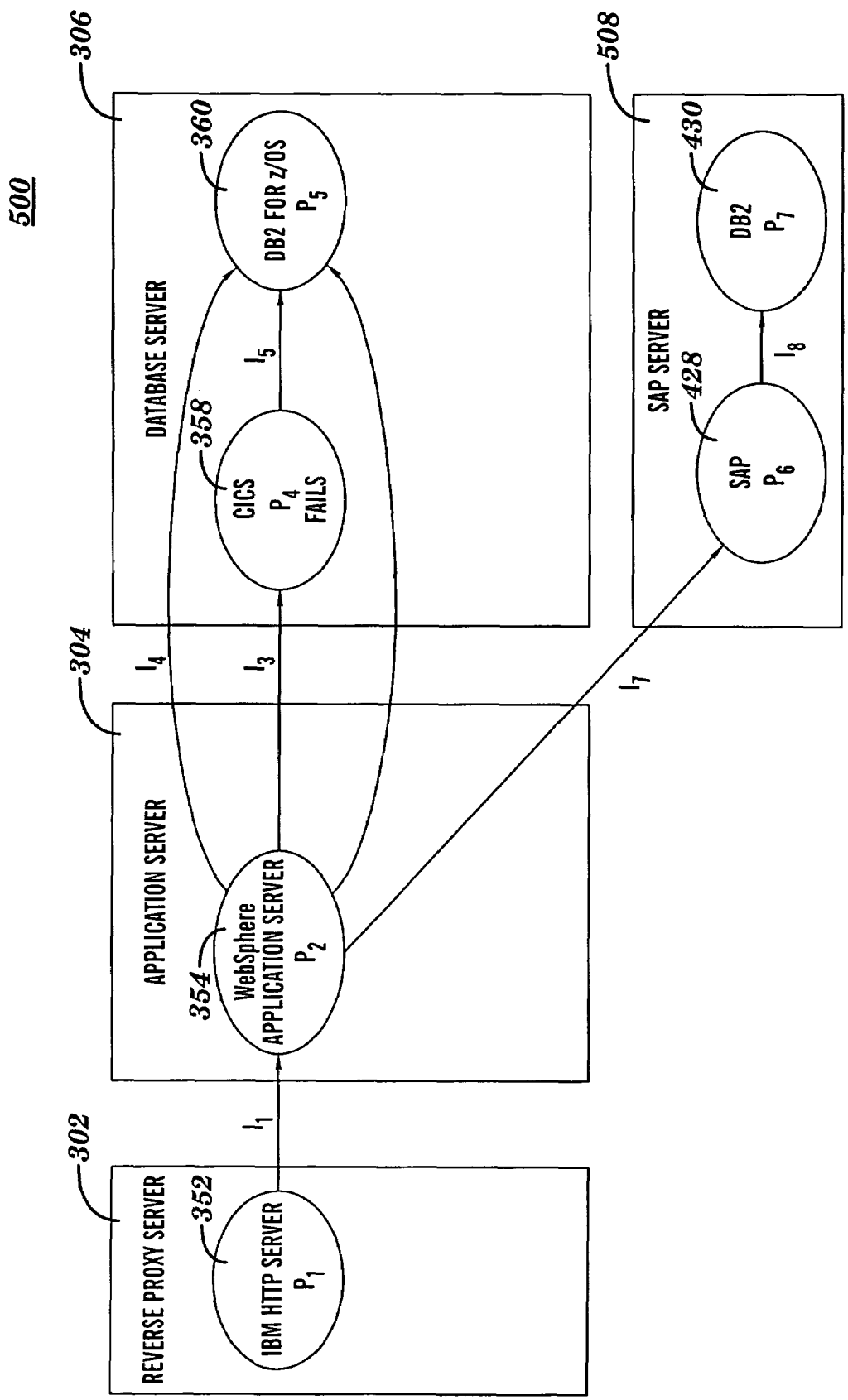
FIG. 5A depicts an architecture of a third application included in the system of FIG. 1A, in which a failure of a process occurs, in accordance with embodiments of the present invention.

FIG. 5A depicts an architecture 500 of a third application included in the system of FIG. 1A, in which a failure of a process occurs, in accordance with embodiments of the present invention. Architecture 500 includes a directed graph representing a third application A3 and servers on which A3 is deployed. Hereinafter, a reference to a $P_i$ vertex of a directed graph is equivalent to a reference to a process that is represented by the $P_i$ vertex.

Application A3 is deployed on reverse proxy server 302, application server 304, database server 306, and a SAP® server 508, which is a financial package available from SAP AG of Walldorf, Germany. Server 302 includes process 352 (e.g., IBM® HTTP Server), server 304 includes process 354 (e.g., WebSphere® Application Server), server 306 includes processes 358 and 360 (e.g., a CICS® and DB2® for z/OS® process, respectively), and server 508 includes processes 428 and 430 (e.g., a SAP® and DB2® process, respectively). Process pairs in architecture 500 are described above relative to FIG. 3C and/or FIG. 4A. Architecture 500 illustrates that process 358 fails and is unavailable to the applications that utilize process 358.

An application is impacted by a failed process if a non-zero element in the application's original adjacency matrix becomes a zero element in the application's adjacency matrix which has been updated after the failed process has been detected. FIG. 5B is an update of the adjacency matrix 390 of FIG. 3D reflecting a process failure, in accordance with embodiments of the present invention. Updated adjacency matrix 530 illustrates that the failure of FIG. 5A has an impact on the application of FIG. 3A. The circled 0 element at row $P_4$, column $P_2$, indicates that a diagnostic transaction returned a failed condition for provider process $P_4$ (i.e., the failed process 358 shown on FIG. 5A). The circled 0 is a change from the original adjacency matrix 390 (see FIG. 3D) for the first application of FIG. 3A, which includes a non-zero (i.e., $I_3$) element at the same $P_4$ row and $P_2$ column. Because of this change from $I_3$ to 0, adjacency matrix 530 indicates that the first application is impacted by the failure in process 358 (see FIG. 5A). Moreover, since process $P_4$ is unavailable, any non-zero element in the consumer process $P_4$ column indicates another process utilized by the application that is unreachable due to the failure detected and shown in FIG. 5A. For example, since the circled $I_5$ appears in the $P_4$ column of matrix 530, the row corresponding to the circled $I_5$ (i.e., $P_5$) indicates that process $P_5$ is unreachable through failed process $P_4$.

Although not shown, an updated adjacency matrix for the second application of FIG. 4A based on the failure of FIG. 5A is exactly the same as the second application's original adjacency matrix 460 (see FIG. 4B), thereby indicating that the second application is not impacted by failed process 358 (see FIG. 5A). That is, the updated adjacency matrix indicates that all connections required by the second application are still available after the failure of process 358 (see FIG. 5A).

Example of Process Failure with Redundant Processes

Figure 6A:
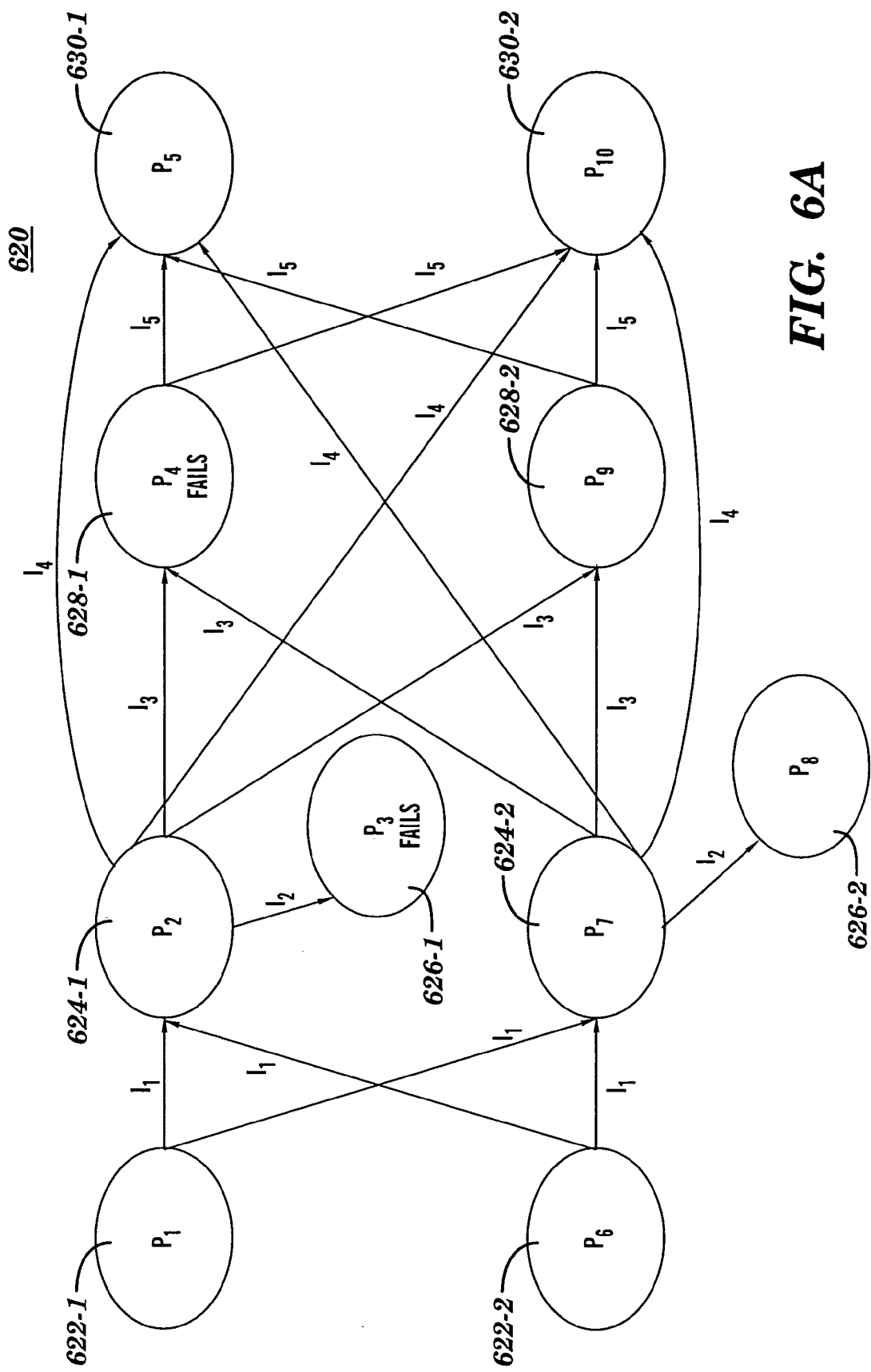
FIG. 6A depicts a directed graph, which represents the processes of a fourth application, and which is an extension of the directed graph of FIG. 3B, in accordance with embodiments of the present invention.

FIG. 6A depicts a directed graph, which represents the processes of a fourth application, and which is an extension of the directed graph of FIG. 3B, in accordance with embodiments of the present invention. Directed graph 620 includes a representation of the architecture of a fourth application A4, where processes 622-1, 624-1, 626-1, 628-1 and 630-1 correspond in a one-to-one manner with processes 352, 354, 356, 358 and 360 of FIG. 3B. Application A4 in FIG. 6A extends the first application A1 to include redundancy of each process of FIG. 3B. That is, processes 622-2, 624-2, 626-2, 628-2 and 630-2 are redundant to (i.e., perform the same function as) processes 622-1, 624-1, 626-1, 628-1 and 630-1, respectively. FIG. 6A also illustrates an example in which failures occur in processes 626-1 and 628-1.

FIG. 6B is an adjacency matrix derived from the directed graph of FIG. 6A, in accordance with embodiments of the present invention. Adjacency matrix 640 includes non-zero elements that each indicate an API utilized in a process pair of FIG. 6A. The process pair is indicated by the column (i.e., the consumer process) and the row (i.e., the provider process) of adjacency matrix 640. A zero element indicates that the corresponding processes indicated by the column and row do not communicate in the fourth application shown in FIG. 6A.

When an application includes a set of redundant processes, an OR operation is performed on the results returned from the diagnostic transactions associated with the set of redundant processes to determine availability within the set of redundant processes. In terms of adjacency matrices adjusted based on failed processes, the OR operation is performed on the rows (a.k.a. row operands) of the adjusted adjacency matrix corresponding to the set of redundant processes and another OR operation is performed on the columns (a.k.a. column operands) of the adjusted adjacency matrix corresponding to the set of redundant processes. If the row-based OR operation results in a zero value at a column where a non-zero value had been located in the original adjacency matrix, then a process is designated as unavailable and the application is determined to be not available. In contrast, if the row-based OR operation results in a non-zero value corresponding to each of the non-zero values in the row operands of the original adjacency matrix, then the required application transactions can be routed via a redundant process instead of the failed process, and the set of redundant processes is available. Similar availability diagnoses are made if the column-based OR operation results in a zero value or in non-zero values as described above.

As one example, a row-based OR operation is applied to redundant processes $P_4$ and $P_9$ in FIG. 6A. Based on the failure of process $P_4$ in FIG. 6A, the $P_4$ row of adjacency matrix 640 is adjusted to be all zeros. The adjusted $P_4$ row is ORed with the P9 row of adjacency matrix 640, which results in:

$$0\ 1_3\ 0\ 0\ 0\ 0\ 1_3\ 0\ 0\ 0$$

This result includes non-zero $I_3$ values that are in the same columns as each of the non-zero values included in row $P_4$ of the original adjacency matrix 640. A similar result with a non-zero $I_5$ value is obtained with a column-based OR operation between $P_4$ and $P_9$. Thus, the set of redundant processes $P_4$ and $P_9$ is available even though process $P_4$ has failed.

As another example, the row-based OR operation is applied to redundant processes $P_3$ and $P_8$ in FIG. 6A. Based on the failure of process $P_3$, the $P_3$ row of adjacency matrix 640 is adjusted to all zero values. The adjusted $P_3$ row is ORed with the $P_8$ row of adjacency matrix 640 to obtain:

$$0\ 0\ 0\ 0\ 0\ 0\ 1_2\ 0\ 0\ 0$$

Since the zero in the $P_2$ column (i.e., the second column) in the result of the OR operation corresponds to a non-zero value in the $P_2$ column of the original adjacency matrix 640, the process $P_2$ is designated as unavailable because it can no longer connect to the $P_3$ process.

Code Examples

The following code example implements a diagnostic transaction utilized in step 208 of FIG. 2. The code returns a failure (i.e., unavailable) or success (i.e., available) determination for a software process. An input XML file (not shown) identifies the LDAP services that are processed by the following code.

```
public ServiceResponse service (ServiceRequest req) throws ServiceException
{
    ServiceResponse resp = new ServiceResponse( );
    ARequest[ ] requests = req.getRequests( );
    int length = requests == null ? 0 : requests.length;
    AResponse [ ] responses = new AResponse[length];
    resp.setRunning (true);
    resp.setResponse (responses);
    resp.setServiceName (req.getServiceName( ));
    // Temp Variables that are mapped to the Input XML file:
    String name = "";
    String host = "";
    String port = "";
    String authMechanism = "";
    String username = "";
    String password = "";
    String dn = "";
    String initCtxFactory = "";
    // Loop for each LDAP Service in the input XML file
    for (int = 0; i < length; i++) {
        responses[i] = new AResponse( );
        responses[i].setRunning (true);
        name = ServiceUtils.getValue (requests[i], Constants.NAME_KEY);
        responses[i].setName (name);
        host = ServiceUtils.getValue (requests[i], Constants.HOST_NODE);
        port = ServiceUtils.getValue (requests[i], Constants.PORT_NODE);
        dn = ServiceUtils.getValue (requests[i], Constants.LDAP_DN_NODE);
        initCtxFactory = ServiceUtils.getValue (requests[i],
Constants.LDAP_INIT_CTX_FACTORY_NODE);
        authMechanism = ServiceUtils.getValue (requests[i],
Constants.LDAP_AUTHENTICATION_MECHANISM_NODE);
        username = ServiceUtils.getValue (requests[i], Constants.USERNAME_NODE);
        password = ServiceUtils.getValue (requests[i], Constants.PASSWORD_NODE);
        Hashtable env = new Hashtable( );
        env.put("java.naming.factory.initial", initCtxFactory);
        env.put("java.naming.provider.url", "ldap://" + host + ":" + port);
        env.put("java.naming.security.authentication", authMechanism);
        if (!"Anonymous".equalsIgnoreCase(username)) {
            env.put("java.naming.security.principal", username);
            env.put("java.naming.security.credentials", password);
        }
        DirContext ctx = null;
        Attributes entry = null;
        boolean exception = false;
        // Obtain the LDAP Context
        try {
            ctx = new InitialDirContext (env);
        } catch (NamingException e) {
            logger.info ("Naming exception occured:" + e.getExplanation( ));
            resp.setRunning (false);
            responses[i].setRunning (false);
            responses[i].setResult(ExceptionInformation.stackTraceToString (e,
Constants.DEFAULT_LINES_TO_SHOW));
            exception = true;
        }
        if (exception) {
            if (ctx != null) try { ctx.close( ); } catch(Exception e) { }
            continue;
        }
        try {
            entry = ctx.getAttributes(dn);
            if (entry == null || entry.size( ) == 0) {
                // FAILURE: Process failure detected
                responses[i].setRunning (false);
                responses[i].setResult ("Failed to get the " + dn);
                logger.info ("Failed to get the" + dn);
            } else {
                // SUCCESS: Available process detected
                responses[i].setResult (Constants.SUCCESS);
                logger.info ("Successful for the" + dn);
            }
        } catch (Exception e) {
            logger.info ("Naming exception occured:" + e.getMessage( ));
            resp.setRunning (false);
            responses[i].setRunning (false);
            responses[i].setResult
(ExceptionInformation.stackTraceToString (e,Constants.DEFAULT_LINES_TO_SHOW));
        } finally {
            if (entry != null) try { entry.remove (dn); } catch(Exception e) { }
```

```
            if (ctx != null) try { ctx.close( ); } catch(Exception e) { }
        }
    }
    return resp;
}
```

The following code examples implement the generation of initial application topologies using adjacency matrices, and the determination of applications impacted by a failed process.

```
// This code snippet builds the initial application topology and a number of Adjacency Matrices:
// (see step 206 of FIG. 2)
// adjacencyMatrixTopologyAllConnections - matrix for the complete set of connections to be monitored
// (changes only when a new topology for any application is discovered)
//     adjacencyMatrixTopologyA1 - matrix for application topology A1
//         // (changes only when a new topology for A1 is discovered)
//     adjacencyMatrixTopologyA2 - matrix for application topology A2
// (changes only when a new topology for A2 is discovered)
//
// For purposes of simplicity in this code snippet, A1 & A2 are shown as separate matrices. In an actual
// system, A1 and A2 would be implemented in a single 3-dimensional matrix, whose three dimensions
// indicate application, consumer process and provider process, or as a sparse matrix.
// Hard coding of application of application names has been done to provide a concrete example.
//
// This code example assumes that the ARM parent and child correlators, and other ARM data, are
// available to the program.
consumerProcessID = parentCorrelator.extractProcessID( ) // Will be null if this is the first unit of work in
// the application
providerProcessID = childCorrelator.extractProcessID( )
AppName = parentCorrelator.extractRootTransactionName( ) // Find the initial ARM transaction name
// (i.e., the "Application Name")
// Are these processes known (i.e., used in an application) already or are they "first of a kind"?
i = consumerProcessList.returnIndex(consumerProcessID)
if (i == NULL) // "First of a kind" consumer process detected
{
    consumerProcessList.addProcess(consumerProcessID) // Add to process list of Consumer processes
    numberOfConsumerProcess++
}
j = providerProcessList.returnIndex(providerProcessID)
if (j == NULL) // "first of a kind" provider process detected
{
    providerProcessList.addProcess(providerProcessID) // Add to process list of Provider processes
    numberOfProviderProcess++
}
// Update all adjacency matrices that describe application topology
connectiontype = parentCorrelator.extractURI( ) // Service type being invoked
switch(connectiontype)
{
    case ('JDBC'):
        // Enable monitoring of the connection as part of the Adjacency Matrix that describes all connections
        if (!(adjacencyMatrixTopologyAllConnections(i, j) & FLAG__JDBC)) // Is this a first of a kind connection?
        {
            adjacencyMatrixTopologyAllConnections(i, j) =
            adjacencyMatrixTopologyAllConnections(i, j) | FLAG__JDBC // Yes add it to overall matrix of
// monitored connections
            // Update the topology matrix that describes Application A1
            if (TranName = "A1")
                adjacencyMatrixTopologyA1(i, j) = adjacencyMatrixTopologyA1(i,j) | FLAG__JDBC // Yes - add it to
// overall matrix of monitored connections
                ...
                // Repeat update of topology matrix for A2 and any other applications
        }
    case ...
    // Repeat for as many other cases as there are APIs or protocols in use
}
// Code example to perform connection monitoring across all the consumer & provider processes used by
// the applications being monitored (see step 208 of FIG. 2)
//
// This step presumes that the application topology has already been discovered and a number of
// Adjacency Matrices have already been constructed:
//     adjacencyMatrixTopologyAllConnections - matrix for the complete set of connections to be monitored
// (changes only when a new topology for any application is discovered)
```

```
//    adjacencyMatrixStatusAllConnections - matrix for the complete set of connections to be monitored
(can change whenever the test loop in this code snippet is executed)
//
for i =1 to numberOfConsumerProcesses // Loop through all consumer processes
    for j =1 to numberOfProviderProcesses // Loop through all provider processes
    {
        consumerProcessID = consumerProcessList.returnProcess(i) // Lookup of Consumer process details
// (system name, IP address, process number, etc.) from the ordered list of consumer processes
        providerProcessID = providerProcessList.returnProcess(j) // Lookup of Provider process details
// (system name, IP address, process number, etc.) from the ordered list of provider processes
        // For each connection and API or protocol that are used in the environment, test the connection to
determine
        // whether it is working
        if (adjacencyMatrixTopologyAllConnections(i , j) & FLAG_JDBC) // Does a JDBC connection need to
// be tested between these two processes?
        {
            if (testConnection(consumerProcessID, providerProcessID,
            FLAG_JDBC) == FAIL)
            {
                // Switch off the flag in the Status matrix to indicate that the connection is unavailable
                adjacencyMatrixStatusAllConnections(i, j) =
            adjacencyMatrixStatusAllConnections(i, j) & (FLAG_JDBC ^ X'FFFF')
            // Exclusive OR the JDBC flag with ones and then AND them to turn it off in the status matrix
            else
            {
                // Set a flag in the Status matrix to Indicate that the connection is available
                adjacencyMatrixStatusAllConnections(i, j) =
            adjacencyMatrixStatusAllConnections(i, j) | FLAG_JDBC;
            }
        }
        if (adjacencyMatrixTopologyAllConnections(i , j) & FLAG_HTTP) // Does a HTTP connection need to
// be tested between these two processes?
        {
            if (testConnection(consumerProcessID, providerProcessID,
            FLAG_HTTP) == FAIL)
                ...
        }
        if (adjacencyMatrixTopologyAllConnections(i , j) & FLAG_xyz) // Does an xyz type connection need
// to be tested between these two processes?
        {
        ...// Test whether the connection is functioning or not
        }
        ...// Test for as many different application connection protocols or APIs as the application supports
    }
}
// Perform impact analysis to compare the determine from the processes which ones are impacted when
// failure occurs. See step 212 of FIG. 2.
//
// The following code snippet presumes that the adjacency matrices used in the previous code snippet are
// available and that topology matrices are available for each application being monitored:
//    adjacencyMatrixTopologyA1 - matrix for application topology A1
// (changes only when a new topology for A1 is discovered)
//    adjacencyMatrixTopologyA2 - matrix for application topology A2
// (changes only when a new topology for A2 is discovered)
//
// For purposes of this code snippet, A1 & A2 are shown as separate matrices. In an actual system, A1
// and A2 would be implemented in a single 3-dimensional matrix including dimensions for application,
// consumer process and provider process, or as a sparse matrix.
// Hard coding of application of application names has been done to provide a concrete example.
//
// Check all connections required for A1 are available.
//
for i =1 to numberOfConsumerProcesses // Loop through all consumer processes used by application A1
    for j =1 to numberOfProviderProcesses // Loop through all provider processes used by application A1
    {
        if (adjacencyMatrixTopologyAllConnections(i , j) ==
        adjacencyMatrixTopologyA1 (i, j)) // Are all connections available that are supposed to be available?
        {
            ...// Yes - A1 is not impacted by failure(s) detected
        }
        else
        {
            ...// No - A1 is impacted by failure(s) detected
        }
    }
}
// Check all connections required for A2 are available
//
for i =1 to numberOfConsumerProcesses // Loop through all consumer processes used by application A2
```

-continued

```
    for j =1 to numberOfProviderProcesses // Loop through all provider processes used by application A2
    {
    ...
    }
}
// Check all connections in any other applications.
```

Computer System for Determining Application Availability

Figure 7:
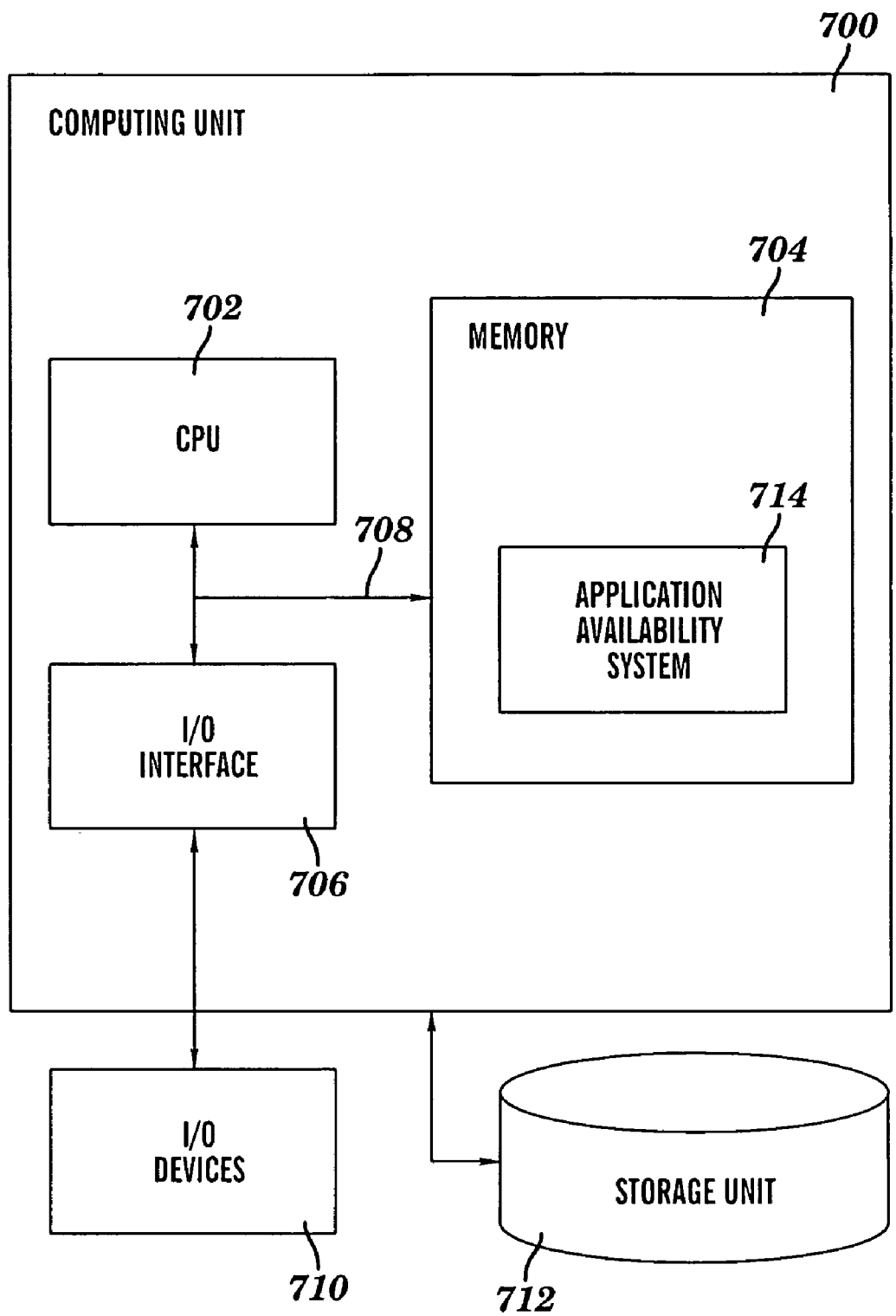
FIG. 7 is a computing unit that includes logic implementing the method of FIG. 2, in accordance with embodiments of the present invention.

FIG. 7 is a block diagram of a computing unit or system included in the system of FIG. 1A, in accordance with embodiments of the present invention. Computing unit 700 may be implemented as a server in which autonomic manager 124 (see FIG. 1A) resides. Computing unit 700 generally comprises a central processing unit (CPU) 702, a memory 704, an input/output (I/O) interface 706, a bus 708, I/O devices 710 and a storage unit 712. CPU 802 performs computation and control functions of computing unit 700. CPU 702 may comprise a single processing unit, or be distributed across one or more processing units in one or more locations (e.g., on a client and server). Memory 704 may comprise any known type of data storage and/or transmission media, including magnetic media, optical media, random access memory (RAM), read-only memory (ROM), a data cache, a data object, etc. Storage unit 712 is, for example, a magnetic disk drive or an optical disk drive. Moreover, similar to CPU 702, memory 704 may reside at a single physical location, comprising one or more types of data storage, or be distributed across a plurality of physical systems in various forms. Further, memory 704 can include data distributed across, for example, a LAN, WAN or storage area network (SAN) (not shown).

I/O interface 706 comprises any system for exchanging information to or from an external source. I/O devices 710 comprise any known type of external device, including a display monitor, keyboard, mouse, printer, speakers, handheld device, printer, facsimile, etc. Bus 708 provides a communication link between each of the components in computing unit 700, and may comprise any type of transmission link, including electrical, optical, wireless, etc.

I/O interface 706 also allows computing unit 700 to store and retrieve information (e.g., program instructions or data) from an auxiliary storage device, such as a non-volatile storage device (e.g., a CD-ROM drive which receives a CD-ROM disk) (not shown). Computing unit 700 can store and retrieve information from other auxiliary storage devices (not shown), which can include a direct access storage device (DASD) (e.g., hard disk or floppy diskette), a magneto-optical disk drive, a tape drive, or a wireless communication device.

Memory 704 includes computer program code comprising an application 714 that includes logic for determining application availability. Further, memory 704 may include other systems not shown in FIG. 7, such as an operating system (e.g., Linux) that runs on CPU 702 and provides control of various components within and/or connected to computing unit 700.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 714 for use by or in connection with computing unit 700 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 704, ROM, a rigid magnetic disk and an optical disk. Current examples of optical disks include compact disk-read-only memory (CD-ROM), compact disk-read/write (CD-R/W) and DVD.

A computing system 700 suitable for storing and/or executing program code 714 include at least one processor 702 coupled directly or indirectly to memory elements 704 through a system bus 708. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 700, wherein the code in combination with computer system 700 is capable of optimally scheduling an activity managed by a web application. The disclosed method for deploying or integrating computing infrastructure with the capabilities described herein can be offered as a service on a subscription service.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of determining an availability of a plurality of applications in a computing environment, comprising:

automatically determining a plurality of topologies of said plurality of applications, wherein a topology of an application of said plurality of topologies of said plurality of applications includes a set of triplets $\{P_i, P_a, P_j\}$, wherein said $P_i$ is an i-th consumer software process of a plurality of consumer software processes included in a plurality of software processes $P_1, \ldots, P_n$, wherein said $P_j$ is a j-th provider software process of a plurality of provider software processes included in said $P_1, \ldots, P_n$, wherein said $P_1, \ldots, P_n$ are a plurality of running instances of computer programs utilized by said application, wherein said $I_a$ is an application programming interface (API) utilized in a request by said $P_i$ for an access to a resource managed by said $P_j$, and wherein $i \neq j$;

initiating, by said $P_i$, a diagnostic transaction between said $P_i$ and said $P_j$, wherein said initiating said diagnostic transaction comprises opening a connection between said $P_i$ and said $P_j$ via said API and requesting, via said API, said access to said resource managed by said $P_j$, said API utilized by said $P_i$ and said $P_j$ to perform any communication therebetween;

completing said diagnostic transaction via receiving, at said $P_i$, a response from said $P_j$ providing said access, or via not receiving said response at said $P_i$;

designating said $P_j$ as available to said application in response to said completing via said receiving said response, or as unavailable to said application in response to said completing via said not receiving said response;

repeating said initiating, said completing, and said designating until each pair of $P_i$, $P_j$ in said set of triplets $\{P_i, I_a, P_j\}$ is utilized by said initiating, said completing, and said designating; and determining an availability of said application based on no software process $P_j$ in said set of triplets $\{P_i, I_a, P_j\}$ being designated unavailable via said designating.

2. The method of claim 1, wherein said initiating said diagnostic transaction further comprises initiating, by a driver component of said $P_i$, said diagnostic transaction, wherein said completing comprises completing said diagnostic transaction via said receiving said response at said driver component from a test component of said $P_j$ or said not receiving said response at said driver component from said test component of said $P_j$, wherein said $P_i$ includes a first set of one or more components other than said driver component, wherein said $P_j$ includes a second set of one or more components other than said test component, said one or more components included in said first set associated with said one or more components included in said second set in a one-to-one correspondence, wherein said designating said $P_j$ as available is based on said driver component receiving said response from said test component without being based on a communication between a first component of said first set of one or more components and a second component of said second set of one or more components.

3. The method of claim 1, wherein said designating said $P_j$ as unavailable indicates a failure of said application, wherein said $P_j$ is responsible for said failure, and wherein said method further comprises:

performing a corrective action in response to said failure of said application, said performing comprising:

re-routing communications associated with said application away from said $P_j$; and adding one or more servers to service said application.

4. The method of claim 1, wherein said topology further includes:

a plurality of servers, wherein one or more software processes of said $P_1, \ldots, P_n$ are deployed and executed on each server of said plurality of servers; and a plurality of sets of configuration data, each set of said plurality of sets of configuration data associated with a software process of said $P_1, \ldots, P_n$.

5. The method of claim 1 further comprising:

converting said plurality of topologies into a plurality of adjacency matrices, wherein said converting said plurality of topologies includes converting said topology into an adjacency matrix that includes a first plurality of elements, each element identified by a row of a plurality of rows and a column of a plurality of columns, wherein said plurality of rows is associated with said plurality of consumer software processes, wherein said plurality of columns is associated with said plurality of provider software processes, wherein a first element of said first plurality of elements having a pre-defined value indicates that no communication is occurring between a first consumer software process of said plurality of consumer software processes and a first provider software process of said plurality of provider software processes, and wherein a second element of said first plurality of elements having a value of a pre-defined set of values other than said pre-defined value indicates an API corresponding to said second element is used in a communication between a second consumer software process of said plurality of consumer software processes and a second provider software process of said plurality of provider software processes;

generating a union of said plurality of adjacency matrices, wherein said union includes a second plurality of elements having a plurality of values of said pre-defined set of values;

periodically performing a plurality of diagnostic transactions, wherein a total of diagnostic transactions in said plurality of diagnostic transactions is equal to a total of elements in said second plurality of elements, wherein said periodically performing said plurality of diagnostic transactions includes said initiating said diagnostic transaction and said repeating said diagnostic transaction;

responsive to said periodically performing said plurality of diagnostic transactions, identifying one or more software processes of said $P_1, \ldots, P_n$ as being unavailable;

determining one or more applications that need to utilize said one or more software processes, wherein said one or more applications are included in said plurality of applications;

determining an unavailability of said one or more applications based on a set of performance standards of an end user; and performing one or more corrective actions to correct said unavailability.

6. The method of claim 5, wherein said topology includes redundancy, said redundancy including a first provider process of said plurality of provider software processes and a second provider process of said plurality of provider software processes having identical functionality, wherein said designating designates said first provider process as unavailable, and wherein said method further comprises:

performing a union of a first row of elements of said adjacency matrix and a second row of elements of said adjacency matrix, said first row being associated with said first provider process and said second row being associated with said second provider process; and re-routing a communication initially designated to be sent from a first consumer process of said plurality of consumer software processes to said first provider process, wherein said re-routing includes designating said communication to be sent from said first consumer process to said second provider process, instead of to said first provider process, wherein said union of said first row of elements of said adjacency matrix and said second row of elements of said adjacency matrix provides a value that is not said pre-defined value and is associated with said first consumer process.

7. The method of claim 1, further comprising defining said topology in an XML file.

8. A system for determining an availability of a plurality of applications in a computing environment, comprising:

means for automatically determining a plurality of topologies of said plurality of applications, wherein a topology of an application of said plurality of topologies of said plurality of applications includes a set of triplets $\{P_i, I_a, P_j\}$ wherein said $P_i$ is an i-th consumer software process of a plurality of consumer software processes included in a plurality of software processes $P_1, \ldots, P_n$, wherein said $P_j$ is a j-th provider software process of a plurality of provider software processes included in said $P_1, \ldots, P_n$, wherein said $P_1, \ldots, P_n$ are a plurality of running instances of computer programs utilized by said application, wherein said $I_a$ is an application programming interface (API) utilized in a request by said $P_i$ for an access to a resource managed by said $P_j$, and wherein i≠j;

means for initiating, by said $P_i$, a diagnostic transaction between said $P_i$ and said $P_j$, wherein said means for initiating said diagnostic transaction comprises means for opening a connection between said $P_i$ and said $P_j$ via said API and means for requesting, via said API, said access to said resource managed by said $P_j$, said API utilized by said $P_i$ and said $P_j$ to perform any communication therebetween;

means for completing said diagnostic transaction via receiving, at said $P_i$, a response from said $P_j$ providing said access, or via not receiving said response at said $P_i$;

means for designating said $P_j$ as available to said application in response to said completing via said receiving said response, or as unavailable to said application in response to said completing via said not receiving said response;

means for repeating said initiating, said completing, and said designating until each pair of $P_i$, $P_j$ in said set of triplets $\{P_i, I_a, P_j\}$ is utilized by said initiating, said completing, and said designating; and means for determining an availability of said application based on no software process $P_j$ in said set of triplets $\{P_i, I_a, P_j\}$ being designated unavailable via said designating.

9. The system of claim 8, wherein said means for initiating said diagnostic transaction further comprises means for initiating, by a driver component of said $P_i$, said diagnostic transaction, wherein said completing comprises completing said diagnostic transaction via said receiving said response at said driver component from a test component of said $P_j$ or said not receiving said response at said driver component from said test component of said $P_j$, wherein said $P_i$ includes a first set of one or more components other than said driver component, wherein said $P_j$ includes a second set of one or more components other than said test component, said one or more components included in said first set associated with said one or more components included in said second set in a one-to-one correspondence, wherein said designating said $P_j$ as available is based on said driver component receiving said response from said test component without being based on a communication between a first component of said first set of one or more components and a second component of said second set of one or more components.

10. The system of claim 8, wherein said designating said $P_j$ as unavailable indicates a failure of said application, wherein said $P_j$ is responsible for said failure, and wherein said system further comprises:

means for performing a corrective action in response to said failure of said application, said means for performing comprising:

means for re-routing communications associated with said application away from said $P_j$; and means for adding one or more servers to service said application.

11. The system of claim 8, wherein said topology further includes:

a plurality of servers, wherein one or more software processes of said $P_1, \ldots, P_n$ are deployed and executed on each server of said plurality of servers; and a plurality of sets of configuration data, each set of said plurality of sets of configuration data associated with a software process of said $P_1, \ldots, P_n$.

12. The system of claim 8, further comprising:

means for converting said plurality of topologies into a plurality of adjacency matrices, wherein said means for converting said plurality of topologies includes means for converting said topology into an adjacency matrix that includes a first plurality of elements, each element identified by a row of a plurality of rows and a column of a plurality of columns, wherein said plurality of rows is associated with said plurality of consumer software processes, wherein said plurality of columns is associated with said plurality of provider software processes, wherein a first element of said first plurality of elements having a pre-defined value indicates that no communication is occurring between a first consumer software process of said plurality of consumer software processes and a first provider software process of said plurality of provider software processes, and wherein a second element of said first plurality of elements having a value of a pre-defined set of values other than said pre-defined value indicates an API corresponding to said second element is used in a communication between a second consumer software process of said plurality of consumer software processes and a second provider software process of said plurality of provider software processes;

means for generating a union of said plurality of adjacency matrices, wherein said union includes a second plurality of elements having a plurality of values of said pre-defined set of values;

means for periodically performing a plurality of diagnostic transactions, wherein a total of diagnostic transactions in said plurality of diagnostic transactions is equal to a total of elements in said second plurality of elements, wherein said periodically performing said plurality of diagnostic transactions includes said initiating said diagnostic transaction and said repeating said diagnostic transaction;

means for identifying, responsive to said periodically performing said plurality of diagnostic transactions, one or more software processes of said $P_1, \ldots, P_n$ as being unavailable;

means for determining one or more applications that need to utilize said one or more software processes, wherein said one or more applications are included in said plurality of applications;

means for determining an unavailability of said one or more applications based on a set of performance standards of an end user; and means for performing one or more corrective actions to correct said unavailability.

13. The system of claim 12, wherein said topology includes redundancy, said redundancy including a first provider process of said plurality of provider software process and a second provider process of said plurality of provider software processes having identical functionality, wherein said designating designates said first provider process as unavailable, and wherein said system further comprises:

means for performing a union of a first row of elements of said adjacency matrix and a second row of elements of said adjacency matrix, said first row being associated with said first provider process and said second row being associated with said second provider process; and means for re-routing a communication initially designated to be sent from a first consumer process of said plurality of consumer software processes to said first provider process, wherein said re-routing includes designating said communication to be sent from said first consumer process to said second provider process, instead of to said first provider process, wherein said union of said row of elements of said adjacency matrix and said second row of elements of said adjacency matrix provides a value that is not said predefined value and is associated with said first consumer process.

14. The system of claim 8, further comprising means for defining said topology in an XML file.

15. A computer program product comprising a computer-usable storage medium including computer-usable program code for determining an availability of a plurality of applications in a computing environment, said computer program product including:

computer-usable code for automatically determining a plurality of topologies of said plurality of applications, wherein a topology of an application of said plurality of topologies of said plurality of applications includes a set of triplets $\{P_i, I_a, P_j\}$, wherein said $P_i$ is an i-th consumer software process of a plurality of consumer software processes included in a plurality of software processes $P_1, \ldots, P_n$, wherein said $P_j$ is a j-th provider software process of a plurality of provider software processes included in said $P_1, \ldots, P_n$, wherein said $P_1, \ldots, P_n$ are a plurality of running instances of computer programs utilized by said application, wherein said $I_a$ is an application programming interface (API) utilized in a request by said $P_i$ for an access to a resource managed by said $P_j$, and wherein i≠j;

computer-usable code for initiating, by said $P_i$, a diagnostic transaction between said $P_i$ and said $P_j$, wherein said computer-usable code for initiating said diagnostic transaction comprises computer-usable code for opening a connection between said $P_i$ and said $P_j$ via said API and computer-usable code for requesting, via said API, said access to said resource managed by said $P_j$, said API utilized by said $P_i$ and said $P_j$ to perform any communication therebetween;

computer-usable code for completing said diagnostic transaction via receiving, at said $P_i$, a response from said $P_j$ providing said access, or via not receiving said response at said $P_i$;

computer-usable code for designating said $P_j$ as available to said application in response to said completing via said receiving said response, or as unavailable to said application in response to said completing via said not receiving said response;

computer-usable code for repeating said initiating, said completing, and said designating until each pair of $P_i, P_j$ in said set of triplets $\{P_i, I_a, P_j\}$ is utilized by said initiating, said completing, and said designating; and computer-usable code for determining an availability of said application based on no software process $P_j$ in said set of triplets $\{P_i, I_a, P_j\}$ being designated unavailable via said designating.

16. The program product of claim 15, wherein said computer-usable code for initiating said diagnostic transaction further comprises computer-usable code for initiating, by a driver component of said $P_i$, said diagnostic transaction, wherein said completing comprises completing said diagnostic transaction via said receiving said response at said driver component from a test component of said $P_j$ or said not receiving said response at said driver component from said test component of said $P_j$, wherein said $P_i$ includes a first set of one or more components other than said driver component, wherein said $P_j$ includes a second set of one or more components other than said test component, said one or more components included in said first set associated with said one or more components included in said second set in a one-to-one correspondence, wherein said designating said $P_j$ as available is based on said driver component receiving said response from said test component without being based on a communication between a first component of said first set of one or more components and a second component of said second set of one or more components.

17. The program product of claim 15, wherein said designating said $P_j$ as unavailable indicates a failure of said application, wherein said $P_j$ is responsible for said failure, and wherein said program product further comprises:

computer-usable code for performing a corrective action in response to said failure of said application, said computer-usable code for performing comprising:

computer-usable code for re-routing communications associated with said application away from said $P_j$; and computer-usable code for adding one or more servers to service said application.

18. A method for deploying computing infrastructure, comprising integrating computer-readable code into a computing system, wherein the code in combination with the computing system is capable of performing a process of determining an availability of a plurality of applications in a computing environment, said process comprising:

automatically determining a plurality of topologies of said plurality of applications, wherein a topology of an application of said plurality of topologies of said plurality of applications includes a set of triplets $\{P_i, I_a, P_j\}$, wherein said $P_i$ is an i-th consumer software process of a plurality of consumer software processes included in a plurality of software processes $P_1, \ldots, P_n$, wherein said $P_j$ is a j-th provider software process of a plurality of provider software processes included in said $P_1, \ldots, P_n$, wherein said $P_1, \ldots, P_n$ are a plurality of running instances of computer programs utilized by said application, wherein said $I_a$ is an application programming interface (API) utilized in a request by said $P_i$ for an access to a resource managed by said $P_j$, and wherein i≠j;

initiating, by said $P_i$, a diagnostic transaction between said $P_i$ and said $P_j$, wherein said initiating said diagnostic transaction comprises opening a connection between said $P_i$ and said $P_j$ via said API and requesting, via said API, said access to said resource managed by said $P_j$, said API utilized by said $P_i$ and said $P_j$ to perform any communication therebetween;

completing said diagnostic transaction via receiving, at said $P_i$, a response from said $P_j$ providing said access, or via not receiving said response at said $P_i$;

designating said $P_j$ as available to said application in response to said completing via said receiving said response, or as unavailable to said application in response to said completing via said not receiving said response;

repeating said initiating, said completing, and said designating until each pair of $P_i$, $P_j$ in said set of triplets {$P_i$, $I_a$,$P_j$} is utilized by said initiating, said completing, and said designating; and determining an availability of said application based on no software process $P_j$ in said set of triplets {$P_i$, $I_a$,$P_j$} being designated unavailable via said designating.

19. The method of claim 18, wherein said initiating said diagnostic transaction further comprises initiating, by a driver component of said $P_i$, said diagnostic transaction, wherein said completing comprises completing said diagnostic transaction via said receiving said response at said driver component from a test component of said $P_j$ or said not receiving said response at said driver component from said test component of said $P_j$, wherein said $P_i$ includes a first set of one or more components other than said driver component, wherein said $P_j$ includes a second set of one or more components other than said test component, said one or more components included in said first set associated with said one or more components included in said second set in a one-to-one correspondence, wherein said designating said $P_j$ as available is based on said driver component receiving said response from said test component without being based on a communication between a first component of said first set of one or more components and a second component of said second set of one or more components.

20. The method of claim 18, wherein said designating said $P_j$ as unavailable indicates a failure of said application, wherein said $P_j$ is responsible for said failure, and wherein said process further comprises:

performing a corrective action in response to said failure of said application, said performing comprising:

re-routing communications associated with said application away from said $P_j$; and adding one or more servers to service said application.

\* \* \* \* \*

UNITED STATES PATENT AND TRADEMARK OFFICE
CERTIFICATE OF CORRECTION

PATENT NO. : 7,587,453 B2  Page 1 of 1
APPLICATION NO. : 11/326559
DATED : September 8, 2009
INVENTOR(S) : Bhrara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this

Twenty-first Day of September, 2010

David J. Kappos
*Director of the United States Patent and Trademark Office*